US011403210B1

(12) United States Patent
McCabe et al.

(10) Patent No.: US 11,403,210 B1
(45) Date of Patent: Aug. 2, 2022

(54) VIRTUAL SIMULATION ENVIRONMENT FOR TESTING FUNCTIONALITY OF PHYSICAL CASH HANDLING DEVICES

(71) Applicant: G4S Retail Solutions (USA) Inc., Jupiter, FL (US)

(72) Inventors: Brian McCabe, Jupiter, FL (US); Shelliene D. Crandall, Jupiter, FL (US); David Wetzel, Jupiter, FL (US)

(73) Assignee: G4S Retail Solutions (USA) Inc., Jupiter, FL (US)

( * ) Notice: Subject to any disclaimer, the term of this patent is extended or adjusted under 35 U.S.C. 154(b) by 26 days.

(21) Appl. No.: 16/931,905

(22) Filed: Jul. 17, 2020

Related U.S. Application Data

(60) Provisional application No. 62/879,225, filed on Jul. 26, 2019.

(51) Int. Cl.
*G06F 9/44* (2018.01)
*G06F 11/36* (2006.01)
*G07F 19/00* (2006.01)
*G06F 8/65* (2018.01)

(52) U.S. Cl.
CPC ............ *G06F 11/3664* (2013.01); *G06F 8/65* (2013.01); *G07F 19/206* (2013.01)

(58) Field of Classification Search
CPC ........ G06F 30/22; G06F 8/65; G06F 11/3664; G07F 19/20; G07F 19/206; G06Q 40/00; G06Q 20/042; G06Q 20/1085; G06Q 20/405; G06Q 40/02
See application file for complete search history.

(56) References Cited

U.S. PATENT DOCUMENTS

| 4,866,605 | A  | * | 9/1989  | Nakano ................... G06F 30/22  703/13 |
| 6,311,165 | B1 | * | 10/2001 | Coutts ................ G06Q 20/1085  235/379 |
| 7,309,004 | B1 | * | 12/2007 | Muschellack ........ G06Q 20/042  235/379 |
| 7,533,802 | B1 | * | 5/2009  | McGinley ............... G07F 19/20  235/376 |
| 7,610,215 | B1 |   | 10/2009 | Folk et al. |
| 7,635,085 | B2 |   | 12/2009 | Brown et al. |
| 7,900,829 | B1 |   | 3/2011  | Folk et al. |
| 7,940,176 | B2 |   | 5/2011  | Bohen et al. |
| 7,950,512 | B2 |   | 5/2011  | Folk et al. |
| 7,954,699 | B1 |   | 6/2011  | Sanders et al. |

(Continued)

OTHER PUBLICATIONS

United States Patent and Trademark Office, Unpublished U.S. Appl. No. 12/241,397.

*Primary Examiner* — Tuan A Vu
(74) *Attorney, Agent, or Firm* — Alston & Bird LLP

(57) ABSTRACT

Cash handling device simulation systems and methods store real-time updated data indicative of the operating software, hardware, and firmware of each of a plurality of physical cash handling devices. Such real-time updated data is configured for executing a simulated operation of one or more cash handling devices based at least in part on simulation input data. The simulation input data may additionally identify one or more cash handling devices for simulated operation thereof, such that the simulation system generates simulated output reflecting output generated by the one or more cash handling devices during operation thereof.

17 Claims, 12 Drawing Sheets

(56) References Cited

U.S. PATENT DOCUMENTS

| | | |
|---|---|---|
| 8,011,581 B1 | 9/2011 | Folk et al. |
| 8,019,663 B1 | 9/2011 | Bohen et al. |
| 8,025,214 B1 | 9/2011 | Folk et al. |
| 8,032,415 B2 | 10/2011 | Sanders et al. |
| 8,047,427 B2 | 11/2011 | Sanders et al. |
| 8,056,305 B1 | 11/2011 | Folk et al. |
| 8,096,398 B2 | 1/2012 | Folk et al. |
| 8,117,127 B1 | 2/2012 | Sanders et al. |
| 8,141,772 B1 | 3/2012 | Folk et al. |
| 8,157,078 B1 | 4/2012 | Folk et al. |
| 8,172,067 B1 | 5/2012 | Folk et al. |
| 8,175,970 B1 | 5/2012 | Mon et al. |
| 8,177,132 B1 | 5/2012 | Bohen et al. |
| 8,181,854 B1 | 5/2012 | Folk et al. |
| 8,181,856 B1 | 5/2012 | Folk et al. |
| 8,196,826 B2 | 6/2012 | Folk et al. |
| 8,201,680 B1 | 6/2012 | Folk et al. |
| 8,210,429 B1 | 7/2012 | Bohen et al. |
| 8,214,257 B1 | 7/2012 | Folk et al. |
| 8,225,988 B1 | 7/2012 | Bohen et al. |
| 8,227,936 B1 | 7/2012 | Folk et al. |
| 8,260,669 B1 | 9/2012 | Folk et al. |
| 8,272,563 B1 | 9/2012 | Folk et al. |
| 8,274,364 B1 | 9/2012 | Bohen et al. |
| 8,327,995 B1 | 12/2012 | Folk et al. |
| 8,346,640 B1 | 1/2013 | Sanders et al. |
| 8,387,874 B1 | 3/2013 | Bohen et al. |
| 8,401,965 B2 | 3/2013 | Johnson et al. |
| 8,407,119 B2 | 3/2013 | Folk et al. |
| 8,430,303 B1 | 4/2013 | Sanders et al. |
| 8,517,257 B1 | 8/2013 | Folk et al. |
| 8,556,166 B1 | 10/2013 | Folk et al. |
| 8,561,885 B1 | 10/2013 | Folk et al. |
| 8,600,842 B1 | 12/2013 | Sanders et al. |
| 8,601,771 B2 | 12/2013 | Folk et al. |
| 8,602,295 B1 | 12/2013 | Sanders et al. |
| 8,781,903 B1 | 7/2014 | Bohen et al. |
| 8,812,366 B2 | 8/2014 | Folk et al. |
| 8,812,394 B1 | 8/2014 | Folk et al. |
| 8,909,547 B2 | 12/2014 | Bohen et al. |
| 8,925,797 B1 | 1/2015 | Bohen et al. |
| 9,004,352 B1 | 4/2015 | Graef et al. |
| 9,064,366 B1 | 6/2015 | Folk et al. |
| 9,070,125 B1 | 6/2015 | Folk et al. |
| 9,098,960 B1 | 8/2015 | Folk et al. |
| 9,311,671 B2 | 4/2016 | Folk et al. |
| 9,547,848 B2 | 1/2017 | Folk et al. |
| 9,697,493 B2 | 7/2017 | Folk et al. |
| 9,715,793 B1 | 7/2017 | Brancaccio |
| 2003/0163398 A1* | 8/2003 | Yoshioka ............... G06Q 40/02 705/35 |
| 2006/0186192 A1* | 8/2006 | Nelson ................. G06Q 20/405 235/379 |
| 2007/0100750 A1* | 5/2007 | Hartfield ................ G07F 19/20 705/43 |
| 2012/0073482 A1 | 3/2012 | Meeker et al. |
| 2013/0159152 A1* | 6/2013 | Minor ................... G06Q 40/00 705/30 |
| 2014/0279675 A1 | 9/2014 | Wiig et al. |
| 2018/0005196 A1 | 1/2018 | Crandall et al. |
| 2018/0218323 A1 | 8/2018 | Nguyen |

* cited by examiner

501
Receive simulation data reflecting interactions with one or more cash handling devices

502
Receive data identifying one or more cash handling devices for simulation

503
Receive user identifying data for a simulation

504
Identify cash handling device types corresponding with cash handling devices identified for simulation

505
Retrieve simulation operation data corresponding with the cash handling device types identified

506
Validate simulation data based at least in part on simulation operation data and generate graphical user interface including listing of errors

507
Validate simulation data based at least in part on simulation operation data and generate graphical user interface including listing of errors

508
Execute simulation operation data for the simulation data

509
Generate output reports

510
Transmit the output reports to a computing entity based at least in part on the user identifying data

VIRTUAL SIMULATION ENVIRONMENT FOR TESTING FUNCTIONALITY OF PHYSICAL CASH HANDLING DEVICES

CROSS-REFERENCE TO RELATED APPLICATIONS

This patent application claims priority to U.S. Provisional Patent Appl. Ser. No. 62/879,225 filed Jul. 26, 2019, which is incorporated herein by reference in its entirety.

BACKGROUND

Providing software updates to physical devices having high online service requirements, such as constant-service requirements or near-constant service requirements (e.g., 99% service time, 95% service time, and/or the like) is subject to a great deal of risk, as software updates may introduce undiscovered software errors that may result in undesired downtime associated with the physical device. Moreover, such software updates may result in undesired deletion of data stored within the physical device, undesired disconnection of data transfer connections, and/or the like. However, various financial institutions, cash handling device operators, merchants, and/or others still desire capabilities for periodically updating the operating software of certain cash handling devices with minimal downtime and minimal risk of service interruptions, and accordingly a need exists for systems and methods for facilitating software updates on hardware devices with minimal service disruptions.

BRIEF SUMMARY

To facilitate software updates to cash handling devices and/or to systems utilizing data generated by various cash handling devices, various embodiments provide a virtual simulation environment reflecting the functionality of one or more cash handling devices, including software-based virtual test simulations reflecting firmware and hardware functionality of those cash handling devices, to simulate interactions between new software updates and the hardware and software functionality of the cash handling device. In certain embodiments, the virtual simulation environment may be configured to simultaneously simulate the functionality of a plurality of cash handling devices each having corresponding hardware features and installed firmware. Accordingly, via a single virtual simulation environment, a user may determine how a software update will function with a plurality of cash handling devices based on simulated operations of those plurality of cash handling devices, and may determine how one or more cash handling devices will generate output files that may be utilized as input for downstream systems.

Certain embodiments are directed to a cash handling device operation simulation system, wherein the cash handling device operation simulation system comprises: one or more memory storage areas storing: real-time updated simulated cash handling device data comprising a plurality of cash handling device profiles each identifying a cash handling device type for a corresponding cash handling device and a location identifier for the corresponding cash handling device; and simulation operation data for a plurality of cash handling device types; and one or more processors collectively configured to: receive simulation data comprising simulated input data for processing via one or more simulated cash handling devices and machine-identifying data identifying one or more of the cash handling device profiles for execution of a simulation; initialize one or more simulated cash handling devices comprising a simulated cash handling device for each of the one or more cash handling device profiles identified within the machine-identifying data; execute the one or more simulated cash handling devices, wherein executing the one or more simulated cash handling devices comprises simulating physical movement of cash within each of the one or more simulated cash handling devices based at least in part on the simulated input data and maintaining a cash ledger based at least in part on the simulated physical movement of cash within each of the one or more simulated cash handling devices; generate one or more output data files based at least in part on the executed one or more simulated cash handling devices, wherein the one or more output data files are generated based at least in part on the simulation operation data corresponding with the simulated cash handling devices.

In certain embodiments, the one or more processors are further configured to, upon receipt of data indicating a software update is provided to one or more physical cash handling devices, update one or more cash handling device profiles such that simulated cash handling devices reflect the software update. In various embodiments, receiving simulation data comprises receiving simulation data files for each of a plurality of simulated cash handling devices; executing the one or more simulated cash handling devices comprises executing a plurality of simulated cash handling devices based at least in part on respective simulation data files of the simulation data; and generating one or more output data files comprises generating at least one output data file by each of the plurality of simulated cash handling devices.

In certain embodiments, the one or more processors are further configured to transmit the one or more output data files to an external computing system in accordance with the simulated cash handling device data. In certain embodiments, generating one or more output data files comprises generating at least one error message in accordance with the simulation operation data. In certain embodiments, the one or more processors are collectively configured to generate a series of graphical user interfaces to facilitate execution of the simulated cash handling devices, wherein the series of graphical user interfaces comprises: an input interface configured to accept the simulation data; an error output interface configured to provide user input indicative of one or more errors generated during execution of the one or more simulated cash handling devices; and an output interface comprising one or more downloadable output data files. In various embodiments, generating the one or more output data files comprises generating a metadata tag for the one or more output data files identifying each of the one or more output data files as simulated output data files. In certain embodiments, the one or more output data files comprise simulated time stamps associated with each of a plurality of output data records.

Certain embodiments are directed to a computer-implemented method comprising: storing within one or more memory storage areas, real-time updated simulated cash handling device data comprising a plurality of cash handling device profiles each identifying a cash handling device type for a corresponding cash handling device and a location identifier for the corresponding cash handling device; storing, within the one or more memory storage areas, simulation operation data for a plurality of cash handling device types; receiving, via one or more processors, simulation data comprising simulated input data for processing via one or more simulated cash handling devices and machine-identifying data identifying one or more of the cash handling device profiles for execution of a simulation; initializing, via the one or more processors, one or more simulated cash handling devices comprising a simulated cash handling device for each of the one or more cash handling device profiles identified within the machine-identifying data; executing, via the one or more processors, the one or more simulated cash handling devices, wherein executing the one or more simulated cash handling devices comprises simulating physical movement of cash within each of the one or more simulated cash handling devices based at least in part on the simulated input data and maintaining a cash ledger based at least in part on the simulated physical movement of cash within each of the one or more simulated cash handling devices; generating, via the one or more processors, one or more output data files based at least in part on the executed one or more simulated cash handling devices, wherein the one or more output data files are generated based at least in part on the simulation operation data corresponding with the simulated cash handling devices.

In various embodiments, the method further comprises, upon receipt of data indicating a software update is provided to one or more physical cash handling devices, updating one or more cash handling device profiles such that simulated cash handling devices reflect the software update. In certain embodiments, receiving simulation data comprises receiving simulation data files for each of a plurality of simulated cash handling devices; executing the one or more simulated cash handling devices comprises executing a plurality of simulated cash handling devices based at least in part on respective simulation data files of the simulation data; and generating one or more output data files comprises generating at least one output data file by each of the plurality of simulated cash handling devices. In various embodiments, the method further comprises transmitting the one or more output data files to an external computing system in accordance with the simulated cash handling device data. In various embodiments, generating one or more output data files comprises generating at least one error message in accordance with the simulation operation data. In certain embodiments, the method further comprises generating a series of graphical user interfaces to facilitate execution of the simulated cash handling devices, wherein the series of graphical user interfaces comprises: an input interface configured to accept the simulation data; an error output interface configured to provide user input indicative of one or more errors generated during execution of the one or more simulated cash handling devices; and an output interface comprising one or more downloadable output data files. In certain embodiments, generating the one or more output data files comprises generating a metadata tag for the one or more output data files identifying each of the one or more output data files as simulated output data files.

Various embodiments are directed to a computer program product comprising a non-transitory computer readable medium having computer program instructions stored therein, the computer program instructions when executed by a processor, cause the processor to: store within one or more memory storage areas, real-time updated simulated cash handling device data comprising a plurality of cash handling device profiles each identifying a cash handling device type for a corresponding cash handling device and a location identifier for the corresponding cash handling device; store, within the one or more memory storage areas, simulation operation data for a plurality of cash handling device types; receive simulation data comprising simulated input data for processing via one or more simulated cash handling devices and machine-identifying data identifying one or more of the cash handling device profiles for execution of a simulation; initialize one or more simulated cash handling devices comprising a simulated cash handling device for each of the one or more cash handling device profiles identified within the machine-identifying data; execute the one or more simulated cash handling devices, wherein executing the one or more simulated cash handling devices comprises simulating physical movement of cash within each of the one or more simulated cash handling devices based at least in part on the simulated input data and maintaining a cash ledger based at least in part on the simulated physical movement of cash within each of the one or more simulated cash handling devices; generate one or more output data files based at least in part on the executed one or more simulated cash handling devices, wherein the one or more output data files are generated based at least in part on the simulation operation data corresponding with the simulated cash handling devices.

In certain embodiments, the computer program instructions are further configured to, when executed by a processor, cause the processor to transmit the one or more output data files to an external computing system in accordance with the simulated cash handling device data. In various embodiments, generating one or more output data files comprises generating at least one error message in accordance with the simulation operation data. In certain embodiments, the computer program instructions are further configured to, when executed by a processor, cause the processor to generate a series of graphical user interfaces to facilitate execution of the simulated cash handling devices, wherein the series of graphical user interfaces comprises: an input interface configured to accept the simulation data; an error output interface configured to provide user input indicative of one or more errors generated during execution of the one or more simulated cash handling devices; and an output interface comprising one or more downloadable output data files.

In various embodiments, generating the one or more output data files comprises generating a metadata tag for the one or more output data files identifying each of the one or more output data files as simulated output data files.

BRIEF DESCRIPTION OF THE SEVERAL VIEWS OF THE DRAWINGS

Reference will now be made to the accompanying drawings, which are not necessarily drawn to scale, and wherein:

FIG. 5 is a flowchart illustrating example steps for executing a simulation according to certain embodiments;

FIG. 7 is an example of contents of an example input data file according to certain embodiments;

FIG. 12 is an example graphical user interface generated by an example system in accordance with certain embodiments.

DETAILED DESCRIPTION

Figure 1:
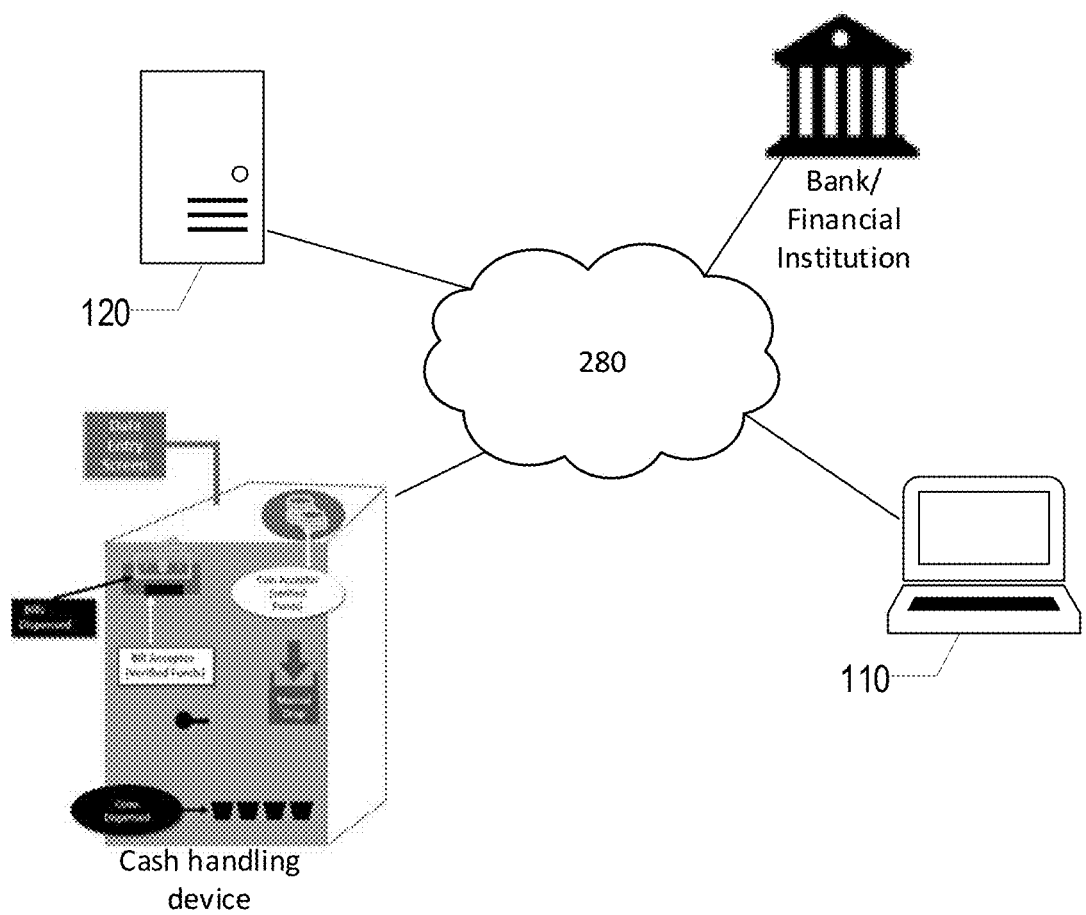
FIG. 1 illustrates a network environment in which data may be transferred regarding the functionality of a cash handling device according to certain embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Certain embodiments are directed to software based virtual simulation environments comprising a plurality of simulations reflecting hardware and firmware functionality of various cash handling devices, and which are configured for receiving various data (e.g., reflective of software for automatically generating cash handling device input; software reflective of example cash handling device data that may be used to generate cash handling device output.

Such configurations enable simulation of software programs (e.g., new or updated software programs) for compliance and functionality with the simulated hardware and firmware functionalities and/or outputs of various cash handling devices. Such testing simulations are configured to generate simulated data outputs (e.g., embodied as simulated data output files) for testing the functionality of one or more systems that utilize cash handling device outputs to function. Certain embodiments may be executable as standalone configurations (e.g., software installed on a computing entity). Other embodiments may be executable as a portion of a multi-functional system, executable on a monitoring server as discussed herein.

The software-based virtual simulation environment may be configured for operating together with a graphical user interface configured for providing a visual indication of the functionality of hardware and/or firmware of each of a plurality of cash handling devices, and/or for generating example output that may be generated by a cash handling device. In certain embodiments, the virtual simulation environments may additionally comprise data indicative of cash handling device types operating at various locations (indicated by corresponding location identifiers), in association with various customers, and/or the like. Accordingly, the virtual simulation environment may be configured to determine the applicability of certain software updates, such as by determining which of a plurality of cash handling device types are impacted by a software update indicated as applicable to particular locations, applicable to particular customers, and/or the like.

As just one example, one or more financial institutions may utilize the output of cash handling devices to provide one or more financial services to financial institution customers, such as providing account management services, deposit and/or withdrawal services, cash location visibility services, and/or the like that rely on data indicative of the current location and/or status of physical cash stored in one or more cash handling devices to provide accurate services to customers. As yet another example, the financial institutions may be required to maintain highly detailed and accurate records of all cash deemed "owned" (and/or managed) by the financial institution for regulatory reporting, auditing (e.g., internal and/or external audits), and/or the like. Because the financial institutions may have an ownership and/or management interest in cash located within one or more cash handling devices, the financial institutions may be interested in maintaining detailed records of cash located in one or more cash handling devices. Because regulatory requirements, customer demands, and/or internal financial institution systems are constantly changing (e.g., via software updates), the financial institutions may desire to periodically test new software to be implemented at their financial institutions and/or in association with operation of one or more cash handling devices prior to a full production roll-out of the new software.

Various embodiments enable those financial institutions to test their under-development software updates using test/simulated data output from one or more simulated cash handling devices, thereby enabling detailed and realistic testing of the under-development financial institution software. Moreover, because the generation and collection of output data from cash handling devices generally occurs over an extended period of time when generated by physical cash handling devices (e.g., as users interact with the cash handling devices through a structured schedule or at organically determined times, for example, when users withdraw cash at the beginning of business days, withdraw additional cash to replenish cashier locations on an as-needed basis throughout a business day, deposit cash at the end of a business day, and/or the like), various embodiments enable users to generate a large quantity of test/simulation data output quickly, by providing input data simulating a plurality of individual interactions with cash handling devices simultaneously (e.g., the input data may comprise simulated timestamps of individual interactions with cash handling devices). For example, the input data may comprise timestamps of simulated interactions with a cash handling device, data indicative of the type of simulated transaction that occurred during each simulated interaction, data indicative of a user identifier (e.g., a simulated user identifier) that initiated each simulated transaction, data indicative of a quantity of cash involved in the transaction (e.g., total quantity of cash, total quantity of individual bills, total quantity of bills of each of a plurality of denominations, and/or the like).

The cash handling device simulation system may be configured to generate simulated output data from a plurality of simulated cash handling devices that are entirely unassociated with any physical cash handling devices in use. For example, simulated cash handling devices may not reflect the amount of cash, the location, and/or other characteristics of any cash handling devices in use (however, output data may identify a location and/or other characteristics of a non-existent simulated cash handling device, such that simulated data outputs resemble realistic data outputs generated by actual cash handling devices). However, the cash handling device simulation system may comprise executable data (e.g., programs, modules, and/or the like) representative of the functionality of one or more cash handling device types in use. These cash handling device types may reflect differences in the functionality of different cash handling devices, such as different cash handling devices manufactured by different manufacturers, different cash handling devices having different features (e.g., certain cash handling devices may be configured to accept coins, certain cash handling devices may be configured to accept manual drops, certain cash handling devices may have recycler functionality, certain cash handling devices may have deposit functionality, certain cash handling devices may have both recycler and deposit functionality, different cash handling devices may be characterized by different sizes (e.g., capacities) of recycler and/or deposit cassettes, and/or the like), different cash handling devices may have different network connection capabilities, and/or the like. Accordingly, certain embodiments may be configured to accept user input designating a particular type of cash handling device for a simulation (data identifying a particular type of cash handling device may be provided within the simulation input data according to various embodiments).

Moreover, the cash handling device simulation system may be configured to accept a single simulation input data file comprising simulated input data to be provided to a plurality of simulated cash handling devices (each of the plurality of simulated cash handling devices may function identically, or the simulated cash handling devices may function differently). Accordingly, the cash handling device simulation system is configured to split input data from a single input data file to be provided to a plurality of cash handling device simulation configurations to reflect differences in the functionality of various cash handling device types.

In certain embodiments, the cash handling device simulation system is configured to retrieve current data regarding one or more physical cash handling devices (e.g., in real-time), such that a simulated cash handling device may be provided within the cash handling device simulation system that simulates the functionality of a physical cash handling device, including quantities of cash located within the cash handling device, quantities of cash associated with the cash handling device (even if not physically located within the cash handling device, such as cash scheduled to be loaded into a cash handling device during a change-order, cash within an external vault associated with the cash handling device, and/or the like), as well as the current status of the cash located within (or otherwise associated with) the cash handling device (e.g., the location of cash within the recycler cassette and/or the deposit cassette of a cash handling device). Accordingly, the cash handling device simulation system may be configured to simulate new transactions at a particular cash handling device based on the selected cash handling device's current status and contents, so as to generate simulation/test output reports, receipts and/or the like that resemble the reports, receipts, and/or the like that would be generated by the cash handling device during actual functionality of the device. Such functionality of the cash handling device simulation system is provided without interrupting service of the actual cash handling device on which a simulation is based. In certain embodiments, the cash handling device simulation system may receive data indicative of the current status of one or more cash handling devices from an external system. In other embodiments (e.g., embodiments in which the cash handling device simulation system is a single module within a multi-functional system), the cash handling device simulation system may receive data indicative of the current status of one or more cash handling devices from one or more components of a common system, such as a common management system.

As discussed herein, the resulting output of the cash handling device simulation system may comprise one or more of: (a) receipts that may be generated by the simulated cash handling device (b) summary reports that may be generated by the cash handling device (or by a centralized management system collecting data from the cash handling devices) of and reflecting one or more transactions, (c) error messages that would be generated by a cash handling device (e.g., in the form of graphical user interface output provided at the cash handling device and/or within receipts and/or reports generated at the cash handling device), and/or the like. The cash handling device simulation system may be configured to customize the output reports in certain embodiments, for example, to reflect the requested output of a particular financial institution, a particular customer, and/or the like.

Moreover, the output data may comprise metadata identifying the output data as test/simulation data, such that the output data does not impact real, functional systems relying on the output of cash handling devices for operation. In certain embodiments, the metadata may comprise a string within a file name, a watermark within the output data files, a user identifier corresponding to the cash handling device simulation system, a single transaction record within a data file identifying the data file as a simulated output data file, and/or the like that identifies the data as simulated output data. In other embodiments, the output of the cash handling device simulation system may be available for download from a specified location (e.g., a specified URL) indicated as making simulated data output available for testing. In various embodiments, the output of the cash handling device simulation system may be provided as a .csv file (or other delimited file type). Moreover, various embodiments are configured to generate a file in a format specified by a particular user, financial institution, and/or the like, to facilitate ingestion of the output into an external system (e.g., a financial institution system). In certain embodiments, the simulated data results may not comprise metadata identifying the output data as simulation results, so as to ensure the results of any subsequent tests (e.g., tests of systems utilizing cash handling device output data as input) are not impacted by the inclusion of simulation-identifying metadata. Once the output is generated, various embodiments may be configured to transmit the output to an external system (e.g., a financial institution system), for example, via contact information provided by a user.

Because the cash handling device simulation system is configured to accept input data files that may each be reflective of a plurality of transactions, the cash handling device simulation system is configured to review the input data files to identify erroneous data, which may be indicative of impossible transactions (e.g., transactions for withdrawing more cash from a cash handling device than is available within the simulated cash handling device; transactions for checking-in a retail till before the same retail till is ever checked out, transactions occurring at non-existent times and/or on non-existent days (e.g., February 30; a transaction at a time of 26:61:22; and/or the like), and/or the like). Determinations of whether an input data file comprises erroneous data may be made based on comparisons between data contained within an uploaded data file and established rules executed by the cash handling device simulation system. In certain embodiments, determinations of whether an input data file comprises erroneous data may be made utilizing machine-learning based algorithms, which may be trained to identify erroneous data utilizing training data tagged with erroneous data, and/or by reviewing data generated by real cash handling devices to identify data types, patterns, and/or the like that may be physically possible within a real, operating environment. Identified errors may be flagged within a graphical user interface and/or within a notification that may be transmitted to a user (e.g., via email).

Moreover, certain embodiments may provide additional customization options for a user, such as options for selecting when an output file should be provided to one or more external systems (e.g., so as to test an external system's capability to process multiple batches of cash handling device output data, provided at differing times), how data within a cash handling device is generated (e.g., on a denomination-level or on a total-contents level), and/or the like.

Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution). The terms software, computer program product, and similar words may be used herein interchangeably.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media/memory).

In one embodiment, a non-volatile computer-readable storage medium may include a floppy disk, flexible disk, hard disk, solid-state storage (SSS) (e.g., a solid state drive (SSD), solid state card (SSC), or solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-recordable (CD-R), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an illustration of an exemplary embodiment of the present invention. As shown in FIG. 1, this particular embodiment may include one or more monitoring servers 120, one or more mobile devices 110, one or more cash handling devices as discussed herein, one or more networks 280 enabling communication among computing devices and a banking institution (e.g., a banking institution server system), and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Monitoring Server

Figure 2:
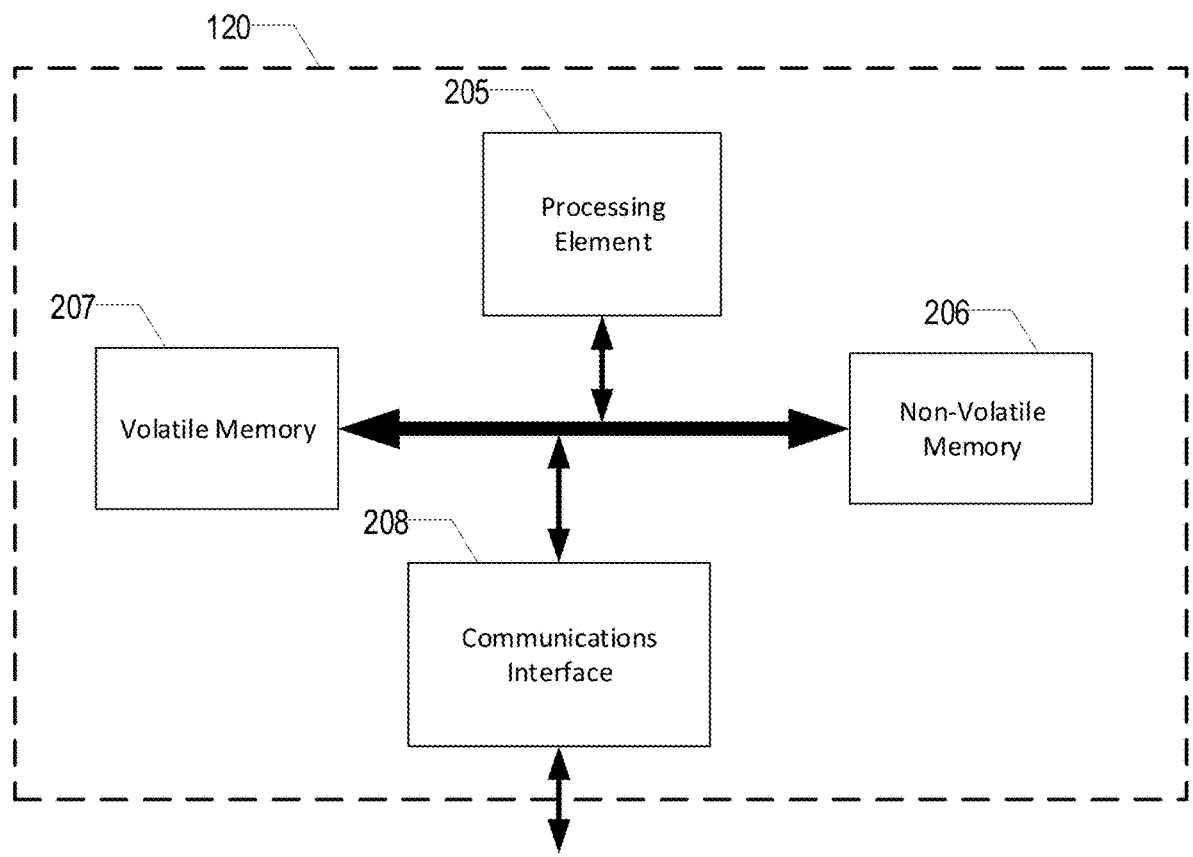
FIG. 2 schematically illustrates features of a monitoring server according to certain embodiments.

FIG. 2 provides a schematic of a monitoring server 120 according to one embodiment of the present invention. In one embodiment, the monitoring server 120 may be in network communication with one or more cash handling devices for monitoring transactions occurring in association with those cash handling devices, one or more banking institutions to transmit transaction data to appropriate banking institutions and/or one or more mobile devices 110 to provide various summary data thereto. In certain embodiments, the monitoring server 120 may be operable in association with other computing devices and/or platforms (e.g., operable via third parties, such as banking institutions' online banking platforms) to accomplish certain functions (e.g., user authentication) to retrieve certain data, and/or the like. In general, the terms computing entity, computer, entity, device, system, server, machine, and/or similar words used herein interchangeably may refer to, for example, one or more computers, computing entities, desktop computers, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, controlling, remotely controlling, dispensing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the monitoring server 120 may include or be in communication with one or more monitoring server data repositories and/or one or more processing elements 205 (also referred to as processors, processing circuitry, processing device, and/or similar terms used herein interchangeably) that communicate with other elements within the monitoring server 120 via a bus, for example. In certain embodiments, the monitoring server data repositories may maintain a wide variety of data accessible to the monitoring server 120, such as user-specific items (e.g., user (login) ID, password (or other authentication credential(s)), one or more account number(s), user name, user registration status, and/or the like). As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media/memory or otherwise accessible to the processing element 205. As such, whether configured by hardware or computer program products, or by a combination thereof, the processing element 205 may be capable of performing steps or operations according to embodiments of the present invention when configured accordingly.

In one embodiment, the monitoring server 120 may further include or be in communication with non-volatile media/memory (also referred to as non-volatile storage, memory, memory storage, memory circuitry and/or similar terms used herein interchangeably). In one embodiment, the non-volatile storage or memory may include one or more non-volatile storage or memory media 206, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the monitoring server 120 may further include or be in communication with volatile media/memory (also referred to as volatile storage, memory, memory storage, memory circuitry and/or similar terms used herein interchangeably). In one embodiment, the volatile storage or memory may also include one or more volatile storage or memory media 207, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring server 120 with the assistance of the processing element 205 and operating system.

As indicated, in one embodiment, the monitoring server 120 may also include one or more communications elements/interfaces 208 for communicating with various computing entities, such as by communicating data, content, information, and/or similar terms used herein interchangeably that can be transmitted, received, operated on, processed, displayed, stored, and/or the like. For instance, the monitoring server 120 may communicate with one or more mobile devices 110, one or more cash handling devices, one or more networks 280, one or more banking institutions' computing systems, and/or the like.

In certain embodiments, the monitoring server 120 may be configured to receive data from a plurality of data sources with respect to cash inventory stored at a particular cash handling device. For example, the cash handling device may provide data indicative of aggregate inputs and outputs of cash to the machine, while a user computing device may provide data indicative of how the aggregate inputs and outputs are divided among a plurality of retail tills (or registers, the terms being utilized herein interchangeably) (e.g., usable with respective POS devices). Accordingly, the monitoring server 120 may be configured to provide till-level inventory tracking configurations based at least in part on the aggregate amount of cash input to or output from a particular cash handling device, as well as manually generated data provided from a user computing entity indicative of how the cash was distributed from/to a various tills.

As indicated, in one embodiment, the monitoring server 120 may also include one or more communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring server 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The monitoring server 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Although not shown, the monitoring server 120 may include or be in communication with one or more input elements, such as a keyboard input, a mouse input, a touch screen/display input, motion input, movement input, audio input, pointing device input, joystick input, keypad input, and/or the like. In one embodiment, the monitoring server 120 may also include or be in communication with one or more output elements (not shown), such as audio output, video output, screen/display output, motion output, movement output, and/or the like.

As will be appreciated, one or more of the monitoring server's 120 components may be located remotely from other monitoring server 120 components, such as in a distributed system. Furthermore, one or more of the components may be combined and additional components performing functions described herein may be included in the monitoring server 120. Thus, the monitoring server 120 can be adapted to accommodate a variety of needs and circumstances. As will be recognized, these architectures and descriptions are provided for exemplary purposes only and are not limiting to the various embodiments.

Exemplary Mobile Device

In one embodiment, a user may be an individual, a representative of a customer, such as a company or organization, and/or the like who wants to deposit and/or withdraw cash from a cash handling device as discussed above. The user may interact with a cash handling device via a user interface thereon, and/or the user may interact with a mobile device 110 to obtain information/data regarding one or more accounts to which the user has access. As will be recognized, an account associated with a cash handling device may be any of a number of different account types, including a bank-owned cash account, a non-bank owned cash account, and/or the like. Accounts may be associated and/or linked with any of a variety of banking institutions holding accounts on behalf of a customer. Moreover, an account could be associated with more than one user (e.g., a plurality of employees associated with a customer holding an account), and each user may have different account access credentials (e.g., a first user may have withdrawal and deposit access and a second user may have deposit only access to an account). Moreover, each user may have access to an account via different access identifiers (e.g., different user identifiers), or in certain embodiments each user may have access to the account via an identical access number. In other embodiments, a single user identifier may be associated with more than one account (e.g., accounts associated with a plurality of departments within a commercial customer).

Figure 3:
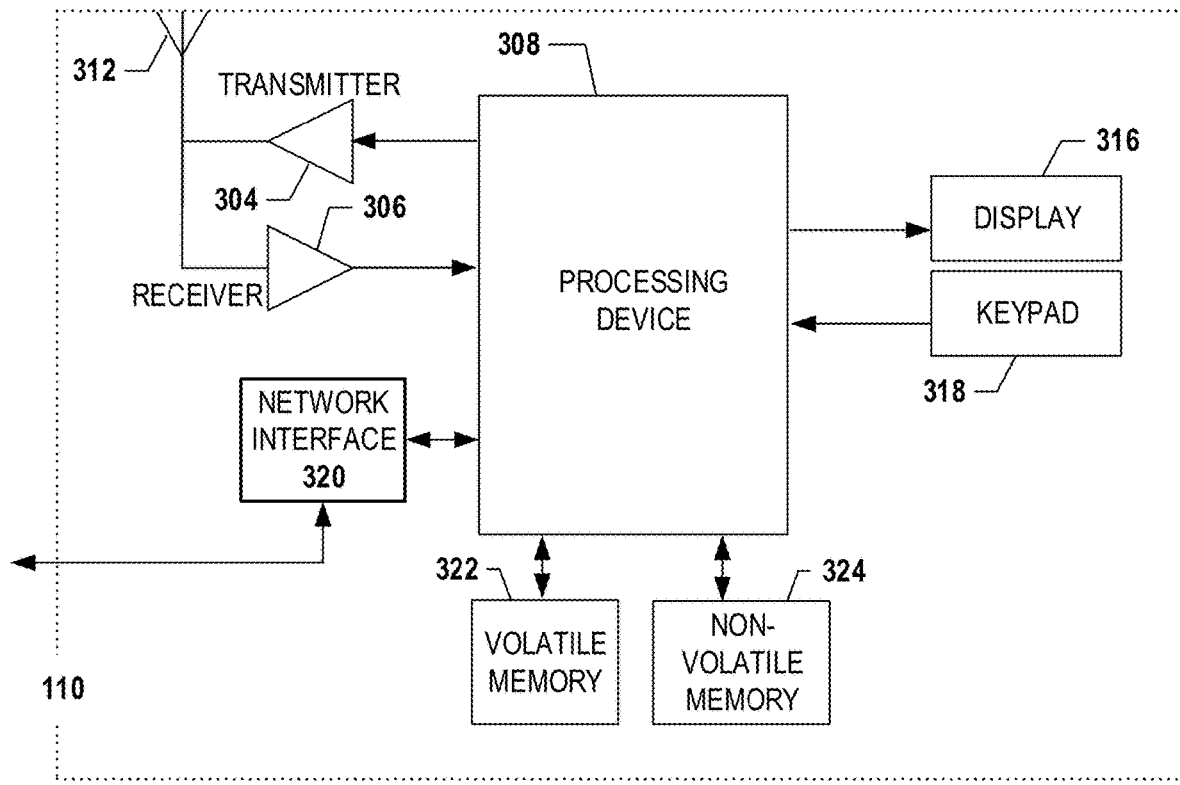
FIG. 3 schematically illustrates features of a handheld device according to certain embodiments.

The mobile device 110 includes one or more components that are functionally similar to those of the monitoring server 120. FIG. 3 provides an illustrative schematic representative of a mobile device 110 that can be used in conjunction with embodiments of the present invention. As noted previously, the terms device, system, computing entity, entity, server, and/or similar words used herein interchangeably may refer to at least, for example, one or more computers, computing entities, mobile phones, tablets, phablets, watches, glasses, ear pieces, wristbands, wearable items/devices, the like, and/or any combination of devices or entities adapted to perform the functions, operations, and/or processes described herein. As shown in FIG. 3, the mobile device 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

In one embodiment, the signals provided to and received from the transmitter 304 and the receiver 306, respectively, may include signaling information/data in accordance with air interface standards of applicable wireless systems. In this regard, the mobile device 110 may be capable of operating with one or more air interface standards, communication protocols, modulation types, and access types. More particularly, the mobile device 110 may operate in accordance with any of a number of wireless communication standards and protocols, such as those described above with regard to the monitoring server 120. In a particular embodiment, the mobile device 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile device 110 may operate in accordance with multiple wired communication standards and protocols, such as those described above with regard to the monitoring server 120 via a network interface 320.

Via these communication standards and protocols, the mobile device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In one embodiment, the mobile device 110 can also download changes, add-ons, and updates, for instance, to its firmware, software (e.g., including executable instructions, applications, program modules), and operating system.

According to one embodiment, the mobile device 110 may include location determining aspects, devices, modules, functionalities, and/or similar words used herein interchangeably. For example, the mobile device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). In one embodiment, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the mobile device's 110 position in connection with a variety of other systems, including cellular towers, Wi-Fi access points, and/or the like. Similarly, the mobile device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, Wi-Fi Direct transmitters, NFC transmitters, and/or the like. These indoor positioning aspects can be used in a variety of settings to determine the location of someone or something to within inches or centimeters.

In one embodiment, the mobile device 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the mobile device 110 to interact with and/or cause display of information/data from the monitoring server 120, as described herein. The user input interface can comprise any of a number of devices or interfaces allowing the mobile device 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In certain embodiments, the user interface (e.g., the display 316) may be configured for displaying access credentials that may be presented to a cash handling device to enable the user to gain account access via the cash handling device. For example, the user interface of the mobile device 110 may be utilized to display a QR code, a bar code, an image, and/or the like that is machine-readable and indicative of the user's access credentials. Similarly, the mobile device 110 may be configured for storing access credentials thereon, and transmitting those access credentials via any of a variety of wireless data transmission protocols (e.g., Bluetooth, Wi-Fi, NFC, and/or the like) to the cash handling device to provide access credentials for the user to the cash handling device.

The mobile device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 110. As indicated, this may include a user application that is resident on the entity or accessible through a browser or other user interface for communicating with the monitoring server 120 and/or various other computing entities.

As will be recognized, the mobile device 110 may include one or more components or functionality that are the same or similar to those of the monitoring server 120, as described in greater detail above. As will be recognized, these architectures and descriptions are provided for exemplary purposes only and are not limiting to the various embodiments.

Cash Handling Device Hardware

Figure 4:
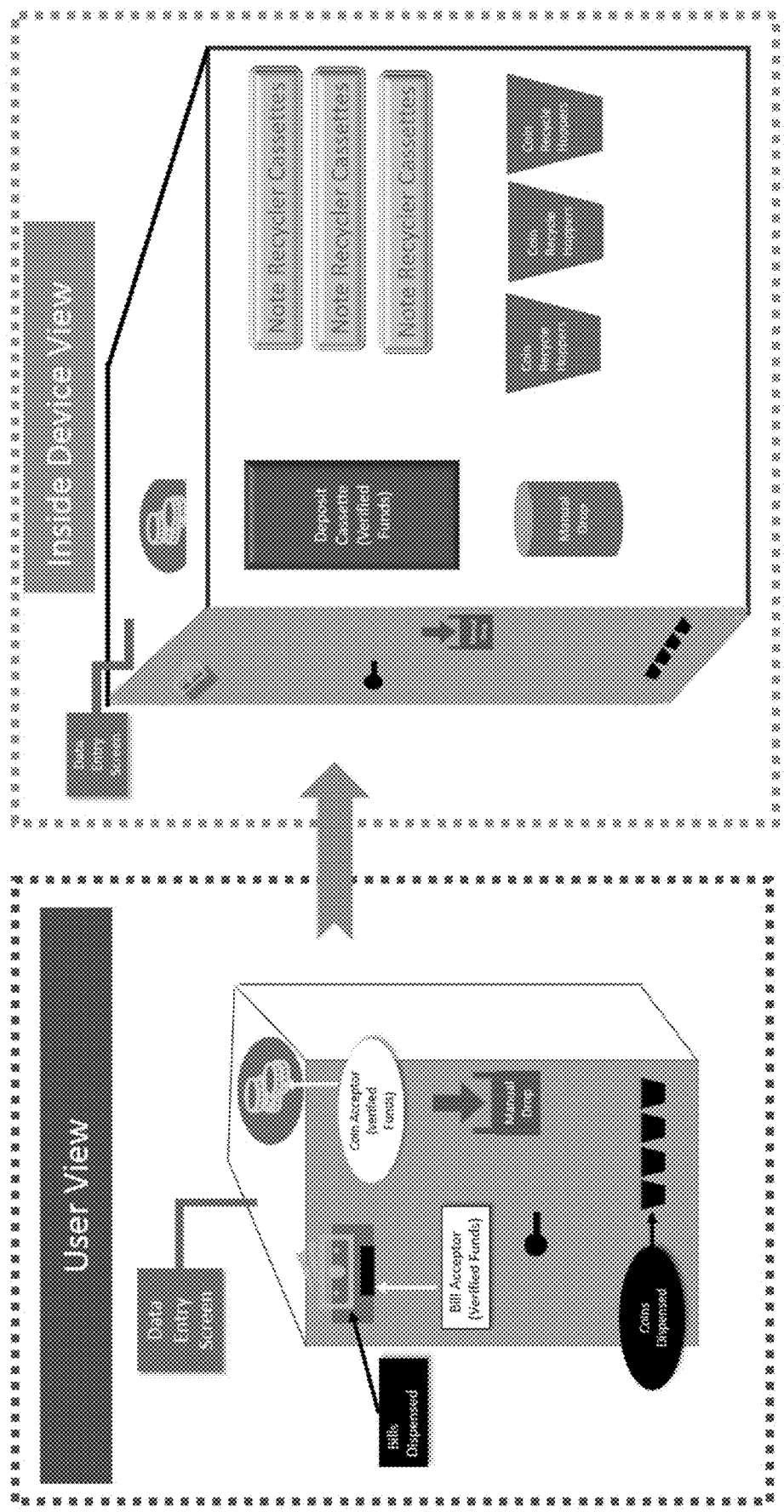
FIG. 4 schematically illustrates features of a cash handling device according to certain embodiments.

An example cash handling device is shown schematically at FIG. 4. As shown therein, components of the cash handling device are disposed within and/or on a housing. The cash handling device may comprise a user interface (e.g., an LCD monitor, a PIN-pad, and/or the like), one or more data readers (e.g., a card reader, a barcode reader, an NFC reader, a camera (which may also be utilized for recording security footage), and/or the like), one or more currency outputs (e.g., a coin dispenser, such as a rolled coin dispenser or a loose coin dispenser, a note dispenser, such as a loose note dispenser or a bound-note dispenser, and/or the like), one or more currency and/or negotiable instrument inputs (e.g., a coin recycler, a check/note scanner/recycler, a deposit cassette, and/or the like), a receipt printer, and/or the like.

The cash handling device components collectively enable a user (e.g., a representative of a particular commercial establishment customer having an account accessible via the cash handling device) to deposit and/or withdraw funds from the cash handling device (which may result in corresponding changes to an account balance in an account held at a particular banking institution for the commercial establishment). In certain embodiments, the cash handling device may enable users to withdraw currency in requested quantities and denominations (e.g., requested quantities of each of a plurality of denominations). Users may interact with the cash handling device via the one or more user interface mechanisms to (1) provide user identifying data (e.g., via the one or more data readers, the PIN pad, a touch screen, and/or the like), and (2) to provide data indicative of a requested transaction to be performed with the cash handling device.

In certain embodiments, a plurality of users may be associated with a single account with the cash handling device, and each of those users may be associated with differing account access levels. For example, a first user may have deposit and withdrawal access for a particular account, while a second user may only have deposit access for the particular account. Data indicative of the access credentials for each user may be stored locally in a non-transitory memory of the cash handling device, on a memory within a physical identification token (e.g., a card) carried by the user, and/or the like.

With reference to FIG. 4, which illustrates a schematic view of various components of a cash handling device according to one embodiment, the cash handling device may comprise one or more components of a note (e.g., note) circulation system and one or more components of a coin circulation system.

In the illustrated embodiment, the note circulation system encompasses a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recycler cassettes and/or deposit cassettes (illustrated in FIG. 4) are counted, imaged, and/or otherwise verified to monitor the quantity of notes deposited/withdrawn, as well as the denomination of those notes. Through the verification mechanism of the note acceptor, the note circulation system may be configured to separate out negotiable instruments (e.g., checks) and/or certain notes for direction to separate storage locations, and/or to separate out and return unreadable notes and/or unreadable negotiable instruments to a user. In certain embodiments, those unreadable notes and/or unreadable negotiable instruments may be resubmitted by the user via a manual drop system, and the user may manually provide information regarding the denomination of the particular notes provided to the cash handling device via the manual drop.

As is particularly relevant for deposits, the note acceptor may be configured to segregate notes by denomination prior to providing those notes to a note recycler and/or deposit cassette. The segregated notes may be stored in separate storage locations (e.g., separated portions of a recycler cassette and/or separated portions of a deposit cassette) such that the notes may be easily recycled based on denomination for later transactions if needed. In certain embodiments, the separate storage locations may comprise separate deposit cassettes, separate recycler cassettes, and/or separated portions of a deposit cassette and/or recycler cassette. As a specific example utilized with U.S. currency, a cash handling device may comprise two cassettes (deposit cassettes, recycler cassettes, or both) configured for receiving and/or dispensing $1 bills, a third cassette (deposit, recycler, or both) configured for receiving and/or dispensing $5 bills, a fourth cassette (deposit, recycler, or both) configured for receiving and/or dispensing $20 bills, a fifth cassette (deposit, recycler, or both) divided into separate sections, a first section for receiving and/or dispensing $5 bills and a second section for receiving and/or dispensing $10 bills. A sixth cassette (deposit only) may be configured for receiving overflow of any denomination of note (including $1, $2, $5, $10, $20, $50, and $100) when a respective denomination-specific cassette is full and/or if no denomination specific cassette is provided for a particular note. For clarity, a cash handling device may comprise deposit only cassettes having the above-referenced configuration, recycler only cassettes having the above-referenced configuration (except for the deposit-only overflow cassette) or may have two sets of cassettes having the above-referenced configuration (e.g., a first set of deposit cassettes having the above-referenced configuration and a second set of recycler cassettes having the above-referenced configuration, but without the overflow cassette). It should be understood that the configuration of specific denomination-specific cassettes mentioned above is presented as an example only, and any combination of denomination-specific cassettes may be utilized.

In certain embodiments, all notes received from the note acceptor during deposit transactions are first directed to a note recycler cassette for storage therein. Notes may be redirected from a recycler cassette to a deposit cassette to remove those notes from circulation upon the occurrence of one or more trigger events, such as a quantity of notes (e.g., a quantity of a given denomination of notes) exceeding a threshold quantity or upon receipt of user input requesting that notes are moved to the deposit cassette. Moreover, as discussed herein, movement of notes to a deposit cassette may itself be a trigger event for various tasks to be performed by the cash handling device or a networked monitoring system, such as transmitting data to a banking institution to direct funds into a particular account at the banking institution.

In certain embodiments, each time notes are moved within the cash handling device, the notes may pass through a quantity and/or denomination verification system to automatically monitor the amount of currency moving between the various portions of the cash handling device, thereby enabling the cash handling device to maintain an accurate count of the amount of currency in each denomination contained therein.

With reference now to the coin circulation system, the cash handling device may be comprise a coin acceptor configured to accept coins deposited by a user of the cash handling device (e.g., accepting rolled coins and/or loose coins). The coin acceptor may have a rejection tray configured to return any unrecognizable coins deposited by the user. Moreover, the coin acceptor comprises a counting and/or verification system configured for counting the quantity and denomination of coins provided via the coin acceptor. Coins may then be passed to one or more coin recycle hoppers (e.g., which may comprise open trays, roll-creating hoppers, and/or the like) for storage within the cash handling device. In certain embodiments, those coin recycle hoppers may be configured for selectably dispensing coins as needed to fulfill a withdrawal request (e.g., as loose coins or as rolled coins). In such embodiments, the coins may be passed to one or more coin dispensing trays (e.g., coin roll dispensing trays or loose coin dispensing trays) for presentation to the user.

Like the note recyclers mentioned above, the cash handling device may comprise a plurality of denomination specific coin hoppers for storage of deposited coins. For example, a cash handling device may comprise a two coin hoppers configured for storing $0.01 coins therein, another two coin hoppers configured for storing $0.05 coins therein, a fifth coin hopper configured for storing $0.10 coins therein, sixth and seventh coin hoppers configured for storing $0.25 coins therein, and an eighth, overflow coin hopper configured for storing coins of any denomination (such as $0.01, $0.05, $0.10, $0.25, $0.50, and $1). A cash handling device may comprise deposit only coin hoppers having the above configuration, recycler coin hoppers having the above configuration, or both recycler coin hoppers and deposit coin hoppers having the above configuration. Moreover, the configuration of denominations of coin hoppers discussed herein is provided merely as an example, any combination of denomination-specific coin hoppers may be utilized.

Moreover, the cash handling device may comprise a manual drop circulation system comprising a manual drop acceptor configured to accept notes and/or negotiable instruments provided by the user, and a manual drop storage cassette. The manual drop acceptor may operate in conjunction with the user interface, such that the manual drop may associate user-provided information regarding the quantity of a particular manual drop (e.g., value, quantity of a particular currency, and/or the like) with notes accepted via the manual drop. In certain embodiments, the manual drop cassette may be configured to separate each collection of notes accepted via the manual drop, such that the user-provided information regarding the quantity of currency provided via the manual drop may remain reflective of an amount of currency stored within a particular separated collection of notes. The manual drop may be a deposit only system, such that notes are not recycled to users from the manual drop cassette.

Although not shown, the cash handling device may be configured for automatically providing cash into a cashier tray (e.g., a tray to be utilized with a cash register at a Point-of-Sale (POS) terminal). In such embodiments, the cashier tray may be supported within the cash handling device, and the cash handling device may selectably deposit quantities of notes and coins of select denominations into segmented portions of the cashier tray.

Moreover, the cash handling device comprises a receipt printer configured for printing physical receipts that may be usable by individual users and/or during change order processing as discussed herein.

Cash Handling Device Controller

A cash handling device having the physical configuration discussed herein may have one or more onboard computing controllers configured for performing various functions and/or for controlling the functionality of various components of the cash handling device. In one embodiment, the cash handling device controller is embodied as a computing entity that may have a configuration similar to the mobile device 110 discussed above, and which may be configured to support processing in connection with deposit and withdrawal transactions for funds via the cash handling device. The one or more cash handling device controllers may include computing device(s) that are local to a corresponding cash handling device and/or computing device(s) that are remotely located. At least one of the cash handling device controllers may be configured to access and store information/data in at least one of one or more datastores to perform processing supported by the cash handling device.

Exemplary Networks

In one embodiment, any two or more of the illustrative components of the architecture of FIG. 1 may be configured to communicate with one another via respective communicative couplings to one or more networks 280. The networks 280 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 280 may have any suitable communication range associated therewith and may include, for example, global networks (e.g., the Internet), metropolitan area networks (MANs), wide area networks (WANs), local area networks (LANs), or personal area networks. In addition, the networks 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Transmissions over networks 280 may be "in the clear" or may leverage one of more of a variety of industry-standard or third-party security technologies implemented in any of the OSI layers used. If encryption is used, it may be symmetric or asymmetric (or implement a combination of the two, as in SSL/TLS, where the initial handshake uses asymmetric encryption in the exchange of symmetric keys, and subsequent transactions use symmetric encryption based on the previously exchanged symmetric keys). As will be recognized, process interaction over a network may be synchronous or asynchronous: synchronous-processes are coupled and include web services (e.g., SOAP), which may in turn leverage http(s); and various other remote procedure call (RPC), middleware protocols, industry-standard exchange formats (e.g., XML or JSON), and integration architectures (e.g., REST) and/or asynchronous-processes are decoupled and mechanisms include message queues and file transfers.

Exemplary System Operation

Various embodiments are directed to systems and methods for simulating operation of one or more cash handling devices, such as by generating simulation data outputs (e.g., embodied as output data files) in the same manner that data outputs may be generated by a cash handling device to reflect one or more transactions and/or other interactions with a cash handling device. Such functionality may provide downstream systems with simulated input, for example, to test reporting, data exports, and/or other functionality of separate systems that rely on data inputs from various cash handling devices, such as client services provided by a financial institution associated with the cash handling device.

Systems and methods provided in accordance with certain embodiments may be configured to provide multi-cultural, multi-language interfaces that operate to provide data to users via a wizard-like sequence of graphical interfaces configured to accept user-provided uploads of simulation data that may be indicative of test scenarios (e.g., simulation input data sets comprising data relating to one or more simulated interactions with a simulated cash handling device) into the system to simulate execution of operation of a cash handling device for generation of data outputs, such as reports, exports, services and/or the like. A sample simulation input may be provided to indicate to the system how the simulations should be created along with drop downs which will allow a user to select the possible options available within the simulation cycle. For example, certain embodiments are configured to maintain a simulated cash ledger indicative of continuous operation of one or more simulated cash handling devices (over a simulated time period identified by simulated time stamps associated with simulated data entries included within the simulation input data).

Various embodiments may be provided as stand-alone systems, or they may be provided as a module of a multi-function system. Various embodiments generate output (e.g., output data files) through designated simulation output channels, and/or the output may comprise metadata designating the output as a simulation data file, thereby enabling receiving systems to distinguish between simulated and real data so as to ensure proper separation between simulation and real data. In certain embodiments, the output is a mirror of real/production output, thereby enabling complete end-to-end testing with complete confidence that the data will be the same when the source data is changed to production/real data.

An example multi-functional system in which the cash handling device simulation system may be incorporated may operate to provide, for example, end-to-end control of receipts, reduction of cash counting activities and streamlining reconciliation processes. Such systems may facilitate "bank owned" cash business models that leverage the cash handling device positions of each denomination of coin and currency, to satisfy banking requirements.

Various embodiments improve merchant cash cycles by identifying and removing excess cash from merchant locations, which enhances cash flow and improves working capital. Merchants benefit from significant cost reduction opportunities via the elimination of dedicated resources for performing deposit preparation, or reductions in armored carrier expenses. Various embodiments also provide merchants the opportunity to re-deploy those resources to performing core deliverables for the business—such as customer-facing services.

As discussed in greater detail herein, the monitoring server 120 of certain embodiments provides simulation processes based at least in part on simulation operation data stored in a memory storage area accessible to the monitoring server 120. Simulation operation data is stored for each of a plurality of cash handling device types, as each cash handling device type may be characterized by unique software, firmware, and/or hardware functionalities that may be reflected within stored executable software-based simulation operation data. Thus, for example, a first cash handling device type may have a coin deposit cassette and may be configured for accepting coins via a coin drop, while a second cash handling device type may not have a coin deposit cassette and may not be capable of accepting coin deposits. Thus, simulation operation data for the first cash handling device type may have software-based simulation functions relevant to a coin drop, while a simulation operation data for the second cash handling device type may have software-based simulation functions indicating that an attempted coin deposit is invalid and cannot be completed as the cash handling device type is incapable of accepting coins. Differences in simulation operation data may reflect differences in software and/or firmware operations of certain cash handling devices. For example, the above-referenced first cash handing device may be configured for generating a cash contents report having a first report formatting after receipt of user input requesting a cash contents report, while the above-referenced second cash handling device may be configured for generating a cash contents report having a second report formatting after the occurrence of a particular deposit activity (e.g., after receipt of a defined number of deposits reflecting the expected number of till-based deposits at an end of a business day. Thus the simulation operation data for the first cash handling device type may reflect the needed user input for generation of appropriate reports, and may reflect the report formatting of the first cash handling device type and the simulation operation data for the second cash handling device type may reflect the automated process for generation of cash content reports and may reflect the report formatting of the second cash handling device type. It should be understood that the simulation operation data may reflect any of a variety of unique features, unique functionalities, and/or the like of a cash handling device type, such that simulation operation data is provided for each of a plurality of cash handling device types.

Moreover, the software and/or firmware of certain cash handling device types may be updated periodically (e.g., via over-the-air software and/or firmware updates, via in-person installations of updated software and/or firmware, and/or the like) and/or certain cash handling device types may receive hardware updates that serve to expand, change, or contract the features provided by the cash handling device type. For example, software updates may be provided to change the output format of reports generated by the cash handling devices of a given type; firmware updates may be provided to activate or deactivate certain hardware features (e.g., to activate a previously unused coin acceptor; to deactivate a faulty coin acceptor; and/or the like); hardware updates may be provided to add new hardware features (e.g., adding a coin deposit cassette and corresponding coin acceptor). To reflect such software, firmware, and/or hardware updates, the simulation operation data may be updated periodically. Such updates may be performed manually, for example, based at least in part on user input providing updated simulation operation data to the monitoring server 120 for storage within the corresponding memory storage area. In other embodiments, the simulation operation data may be performed automatically, for example, upon receipt of data from a cash handling device reflecting updates to software, firmware, and/or hardware operating thereon. In such embodiments, the data received from the cash handling device may reflect updates to software operating at the cash handling device (e.g., to reflect the updated software, firmware, and/or hardware operating at the cash handling device), and such data may be utilized to automatically update the data stored within the memory storage area to reflect the updates to the functionality of the cash handling device types. As a part of the process for updating the simulation operation data corresponding to a particular cash handling device type, the monitoring server 120 may be configured to execute a validation process to ensure the cash handling device is operating properly and properly reflects the functionality of the cash handling device type prior to updating the simulation operation data stored within the memory storage area.

Figure 6:
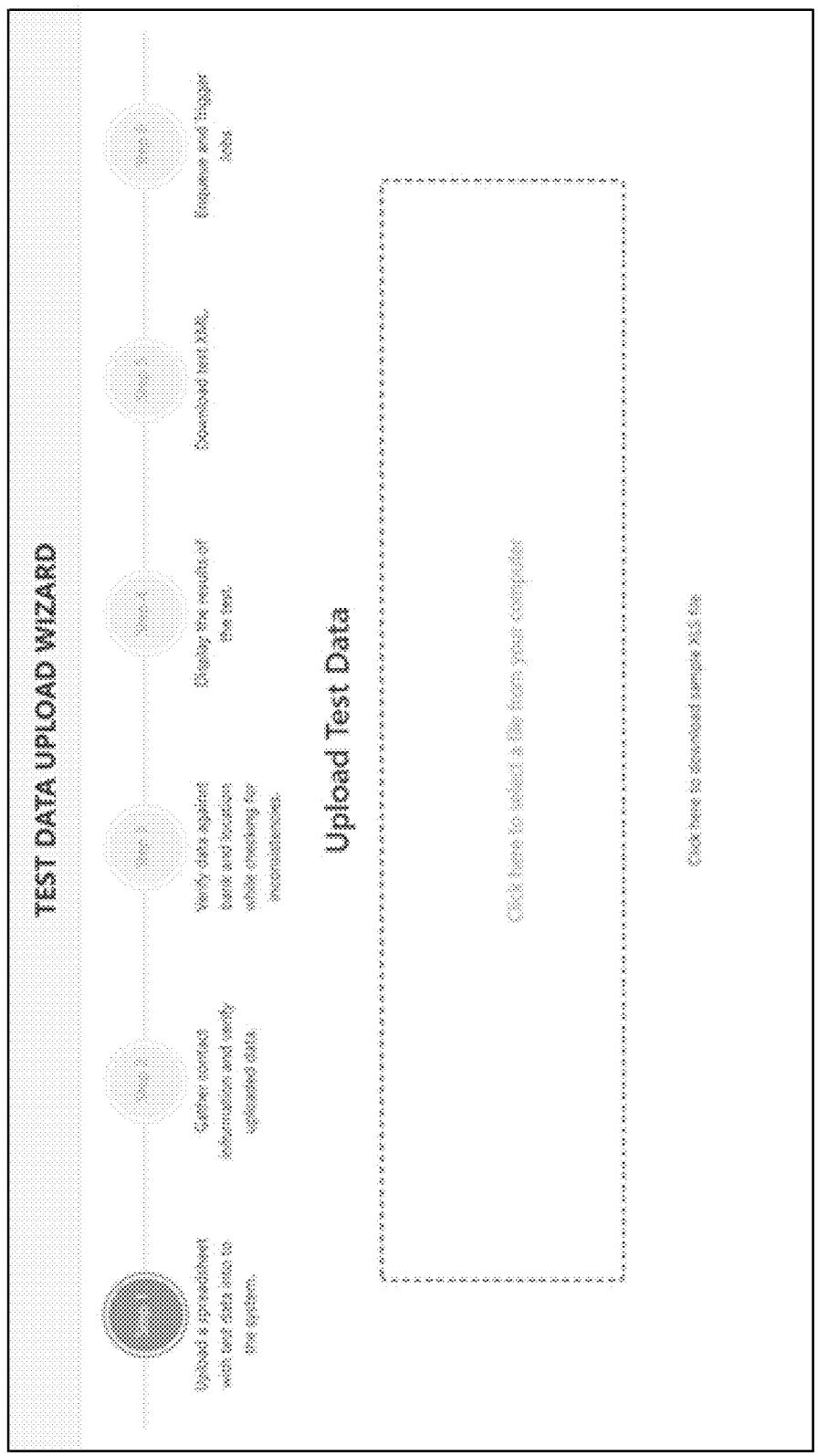
FIG. 6 is an example graphical user interface generated by an example system in accordance with certain embodiments.
Figure 7:
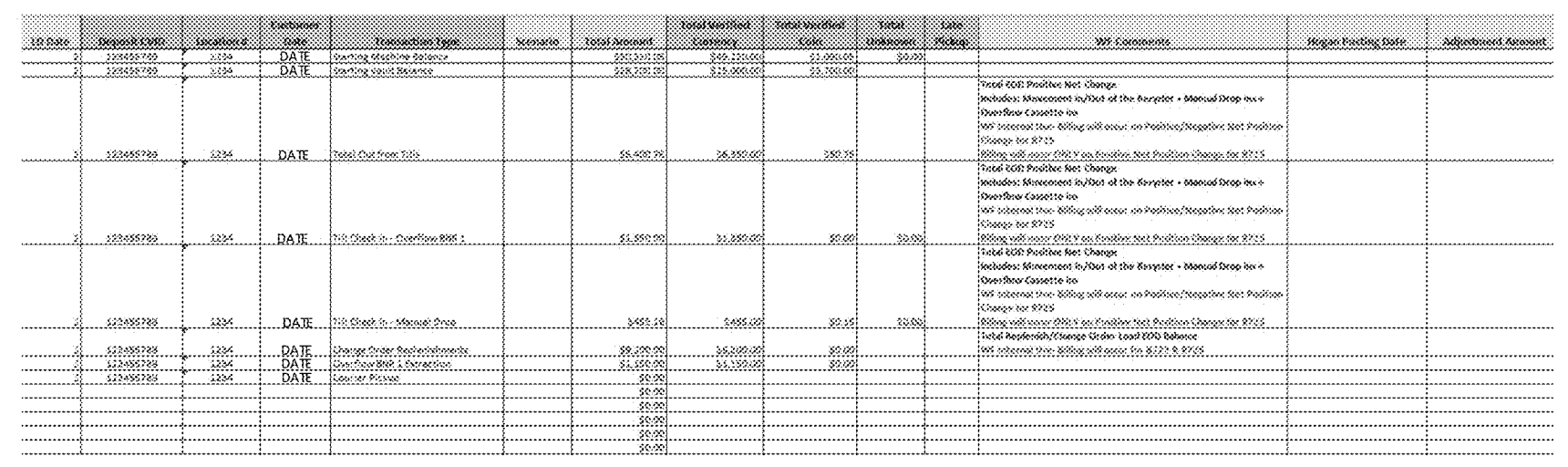

FIG. 5 is a flowchart illustrating an example process for executing a simulation relating to one or more cash handling devices in accordance with certain embodiments. As shown at Block 501, the monitoring server 120 is configured to receive simulation data for one or more requested simulations of operation of cash handling devices. The simulation data comprises simulation input data reflecting simulated interactions with one or more cash handling devices. In certain embodiments, the simulation data additionally comprises machine-identifying data (e.g., embodied as a location identifier or other data identifying a specific cash handling device for simulation, or identifying a specific cash handling device type (without reference to a specific real/physical cash handling device) for simulation. The monitoring server 120 may be configured to receive such data via a data file upload configuration, which may be accessible via an interactive graphical user interface such as that illustrated at FIG. 6. The monitoring server 120 may be configured to accept any of a variety of data file uploads, such as delimited files reflecting a plurality of aspects of simulated interactions with a cash handling device. As a specific example, such delimited files may be characterized with a plurality of data rows, with each data row reflecting a particular simulated interaction with a cash handling device. Each row may comprise data specifying an interaction type (e.g., a user interaction with a graphical user interface of a cash handling device; a deposit of cash and/or coins at a cash handling device; a withdrawal of cash from the cash handling device; and/or the like). Each row may additionally comprise data indicating a simulated date and/or time for the interaction (e.g., a simulated time stamp) with the cash handling device, an identification of the cash handling device (embodied as the machine-identifying data discussed above), an amount of cash involved in the interaction with the cash handling device (e.g., the amount of cash withdrawn, the amount of cash deposited, and/or the like). As relevant, each row/entry may additionally comprise data indicating a source and/or destination of cash associated with the cash handling device (e.g., a till identifier, a financial institution account, a carrier, and/or the like). Additional data may be included within each row of a data upload as necessary in accordance with certain embodiments. Thus, a single data file may reflect a plurality of simulated interactions with a plurality of simulated cash handling devices in accordance with certain embodiments. An example input file is illustrated at FIG. 7.

The simulation input file may be utilized for providing data indicative of one or more types of transactions/interactions occurring at a cash handling device. For example, the one or more types of transactions/interactions may be indicated as one or more of: (1) starting machine balance (indicating a starting balance of a simulated cash handling device); (2) starting vault balance (indicating a starting balance of external vault funds that may be held at a financial institution and made available for transactions to the simulated cash handling device); (3) till check out (defining a register amount being checked out); (4) change order replenishment (funds being transferred from the external vault (financial institution) to the cash handling device); (5) courier pickup (funds being extracted from one or more storage areas of the cash handling device, such as a manual drop, a recycler cassette, a deposit cassette, and/or the like); (6) till check in (funds added to the cash handling device from a register); (7) till check in-manual drop (funds added to the cash handling device's manual drop intake, if applicable); (8) till check in-overflow (funds added to the cash handling device's deposit cassette); and/or the like.

Moreover, as certain cash pieces may not be verifiable via automated systems (e.g., due to damage of the cash piece), the input data sheet may be utilized for simulating transactions involving a cash handling device receiving or outputting verified or unverified funds for various transactions. Accordingly, the input data sheet may comprise data indicating whether a particular quantity of funds involved in a simulated transaction are verified funds or unverified funds.

Alternatively or additionally, certain embodiments may be configured for generating an interactive graphical user interface enabling users to generate simulation input data as a listing of a plurality of simulated interactions with cash handling devices in accordance with certain embodiments. For example, an interactive graphical user interface may comprise a plurality of user interface elements each configured to receive user input entering and/or otherwise selecting aspects of a simulated cash handling device interaction (e.g., such as those aspects discussed in reference to the contents of a single row of a cash handling device interaction, above). A user may thus generate a listing of cash handling device interactions within the interactive graphical user interface provided by the monitoring server 120 in accordance with certain embodiments. As yet another example implementation, the monitoring server 120 may be configured to automatically generate at least a portion of the input data of certain embodiments. For example, the monitoring server 120 may be configured to generate a semi-random listing of interactions with one or more cash handling devices (ensuring that the listing of interactions satisfies applicable rules, as discussed in greater detail herein). In certain embodiments, the listing of simulated interactions may be generated for an identified listing of simulated cash handing devices. In other embodiments, the listing of simulated interactions may be generated for a randomized assortment of simulated cash handling devices (as selected by the monitoring server 120).

In certain embodiments, the simulation input data may be configured for initializing operation of one or more simulated cash handling devices without existing operational data associated with the cash handling device types. In such embodiments, each simulated cash handling device may be initialized as having a starting balance of zero (such that a first interaction should be indicated as a deposit of cash to provide cash to the cash handling device). In other embodiments, the simulated cash handling devices may operate with the input data based at least in part on real-time data of a current contents of the cash handling device as of a designated date and time. In such embodiments, the monitoring server 120 may be configured to identify historical data indicative of the total contents of a particular cash handling device, and may append or otherwise generate input data to generate simulated historical data for the simulated cash handling device, such that the input data discussed in reference to Block 501 operates to provide additional simulated interactions with the simulated cash handling device based on the contents of the simulated cash handling device as reflecting the real contents of an identified cash handling device at a designated date and time. Moreover, in such embodiments, simulated date and time stamps associated with each entry of the simulation input data should be provided in reference to the identified date and time for which the cash handling device data is provided, such that further simulated interactions with the simulated cash handling device occur after the simulated historical data appended or otherwise generated by the monitoring server 120.

As reflected in Block 502, the monitoring server 120 receives data identifying one or more cash handling devices to be reflected within an executed simulation. The cash handling devices may be identified as a part of the input data (discussed above), or the cash handling devices may be identified separately, such as via a separate interactive graphical user interface that may be utilized for identifying cash handling devices for inclusion with a simulation.

The monitoring server 120 may be additionally configured to receive user identifying data associated with a simulation, such as user contact information (e.g., an email address, a phone number, a unique user identifier associated with the monitoring server 120 and a user requesting execution of a simulation), and/or the like. Such data may be utilized for providing the resulting output of a simulation to a user, for providing a user with a notification that the resulting output of a simulation is available for download, and/or the like.

Once the input data is received along with an identification of cash handling devices for simulation, the monitoring server 120 is configured to retrieve profile data associated with the cash handling devices. The profile data associated with each of the cash handling devices may identify a cash handling device location, a customer associated with the cash handling device, a cash handling device type (which itself may be indicative of one or more software, firmware, and/or hardware features available via the cash handling device), and/or the like. Accordingly, as indicated at Block 504, the monitoring server 120 is configured to identify a cash handling device type associated with each of the one or more cash handling devices (e.g., as identified within the cash handling device profile data). Based at least in part on the identified cash handling device type, the monitoring server 120 is configured to retrieve simulation operation data corresponding with the cash handling device types identified as relevant for a simulation, as indicated at Block 505. Such simulation operation data is stored in a memory storage area as discussed herein, and the simulation operation data may comprise executable portions configured for execution in relation to input data so as to simulate the resulting operation of a cash handling device based at least in part on simulated interactions with the cash handling device as identified within the input data. Moreover, the simulation operation data may identify one or more limitations of operations of various cash handling device types, thereby enabling the identification of errors in input data.

As indicated at Block 506, the monitoring server 120 is configured to validate the input data. As a part of validating the input data, the monitoring server 120 may ensure that any uploaded data files comprising input data is not corrupted, that the included data is provided in an expected format, and/or the like. Moreover, validating the input data may additionally comprise comparing the input data against one or more rules indicative of features and/or operation of various cash handling device types. For example, validating the input data may comprise ensuring that input data applicable to a cash handling device type that is incapable of accepting coin deposits does not include data indicative of simulated cash handling device interactions comprising coin deposits. Moreover, more generally applicable rules may be applied, such as ensuring that simulated interactions with a cash handling device is not indicative of a cash withdrawal that results in a cash balance less than zero.

Figure 11:
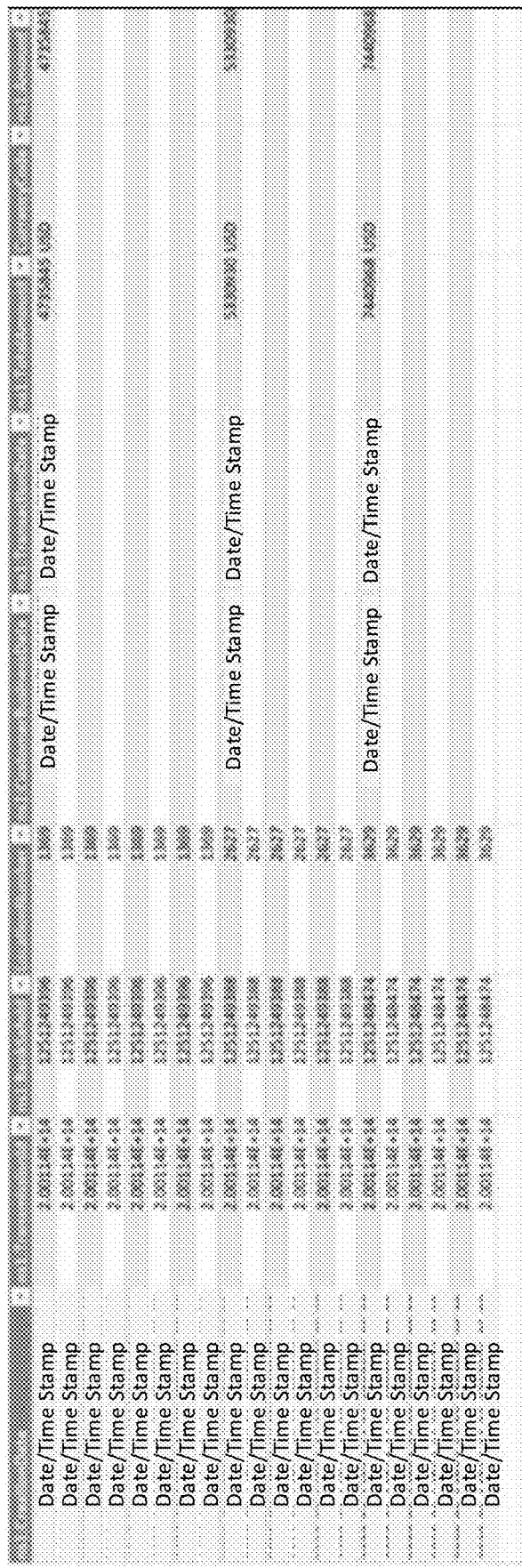
FIG. 11 is an additional example simulated input data file provided in accordance with certain embodiments.

FIG. 11 illustrates example data that may be provided in an input data file in accordance with certain embodiments. As shown in FIG. 11, the example data provided as input may comprise a plurality of data entries reflective of a plurality of transactions occurring on one or more dates and involving one or more simulated cash handling devices (as reflected by different location identifiers corresponding with each transaction).

Figure 12:
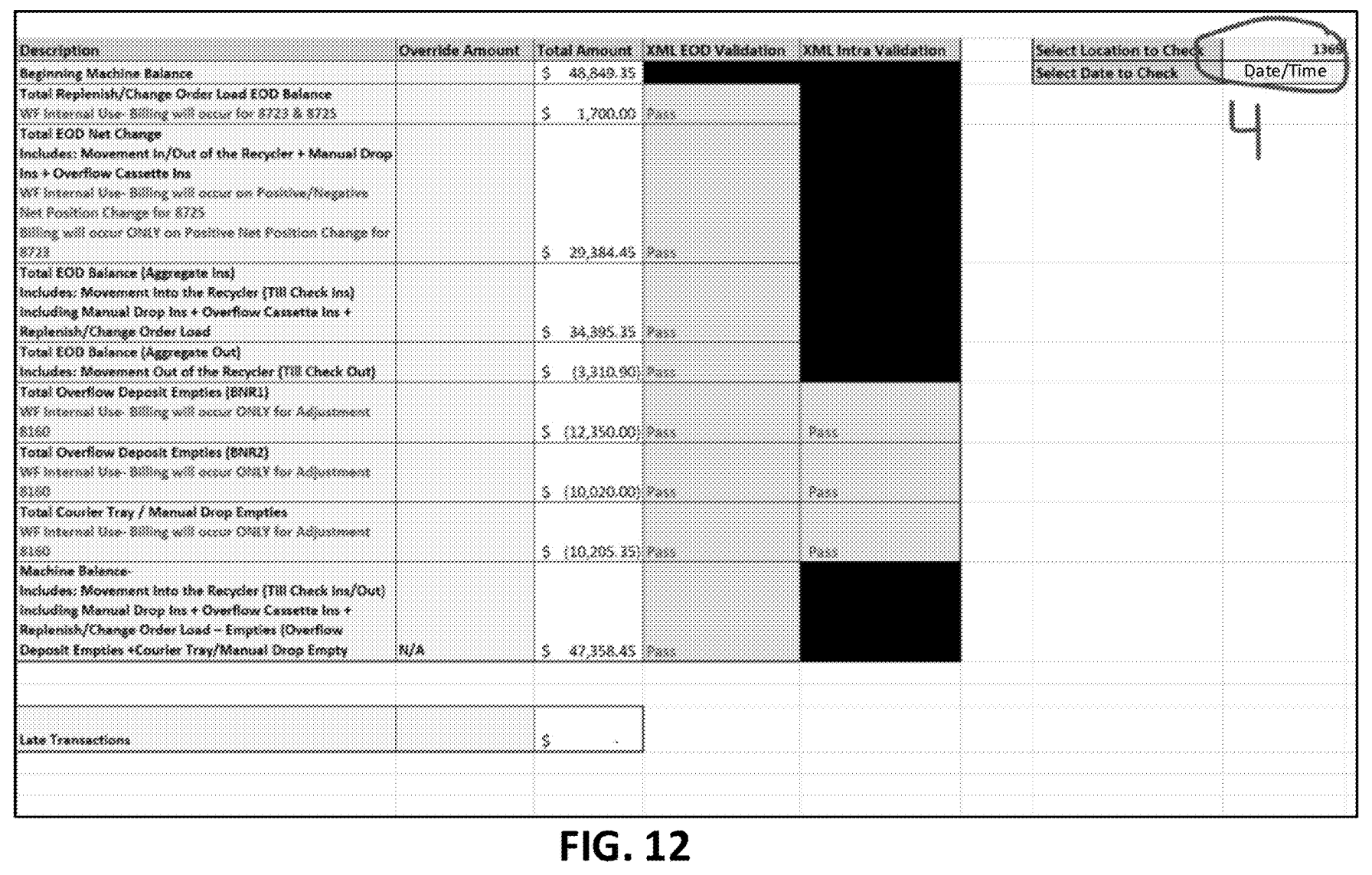

FIG. 12 illustrates an example output graphical user interface that may be generated for providing the results of a data validation process to a user. As reflected within the example graphical user interface shown at FIG. 12, the data validation process may be configured for providing data validation for data entered for each simulated cash handling device separately (as indicated by the user-entry field requesting "select a location to check"). Accordingly, the monitoring server 120 may be configured to review a data input file and extract those transaction records identified as corresponding with the particular simulated cash handling device for which validation is requested, so as to ensure the one or more entries corresponding with the simulated cash handling device pass necessary data validation processes. Similarly, the data may be further filtered during validation, so that data may be validated for a particular day (or a particular end-of-day processing time-stamp), such that only those entries corresponding to the selected day or end-of-day processing time-stamp may be reviewed for validation. Accordingly, the monitoring server 120 is configured to individually validate a plurality of subsets of the input data such that the monitoring server 120 is configured to provide precise indications of what portions of the data are indicative of errors, if applicable.

Moreover, as further indicated in the example of FIG. 12, the monitoring server 120 may be configured for executing one or more data validation processes, such as a data validation process for a particular end-of-day processing time-stamp so as to ensure that all corresponding transactions are error free, an intra-day data validation, and/or an inter-day data validation to ensure that the input data does not introduce errors associated with providing a multi-day dataset (wherein the end-of-day data carries over to begin a consecutive day).

As noted, FIG. 12 provides an example user interface of a validation graphical user interface generated by a monitoring server 120 for a dataset in accordance with certain embodiments. As reflected therein, the monitoring server 120 may be configured to execute validation checks for a plurality of aspects of an input dataset, such as ensuring the input data (or other data source) defines a beginning machine balance, checking the total replenish/change order load end-of-day balance reflected within the data to ensure that no impossible fund quantities are defined therein, checking a total end-of-day net change to ensure that no impossible fund quantities are defined therein, a total end-of-day balance to ensure consistency with other data therein, a total overflow deposit amount (e.g., amount of funds provided to a deposit cassette) to ensure that the total deposits do not exceed a capacity of the deposit cassette, total manual drop entries to ensure that the total manual drop entries does not exceed a capacity of a manual drop cassette, a machine balance, and/or the like. It should be understood that other validation checks may be implemented in certain embodiments.

As discussed herein, upon detecting one or more errors within the input data, the monitoring server 120 may be configured to provide a graphical user interface requesting the user to reupload the input data after correction of the identified errors. The process may then repeat for validating the input data after reuploading.

Moreover, the monitoring server 120 may be configured for executing data validation processes for data files generated via the simulation processes discussed herein, so as to ensure that the simulated cash handling devices do not themselves generate one or more error states (having corresponding error messages). Such error states may be indicative of an incorrectly configured simulated cash handling device, or that a software update provided to a cash handling device does not enable proper functionality of a cash handling device, such that changes to the software or firmware provided to a cash handling device should be modified to remedy the identified errors.

Figure 8:
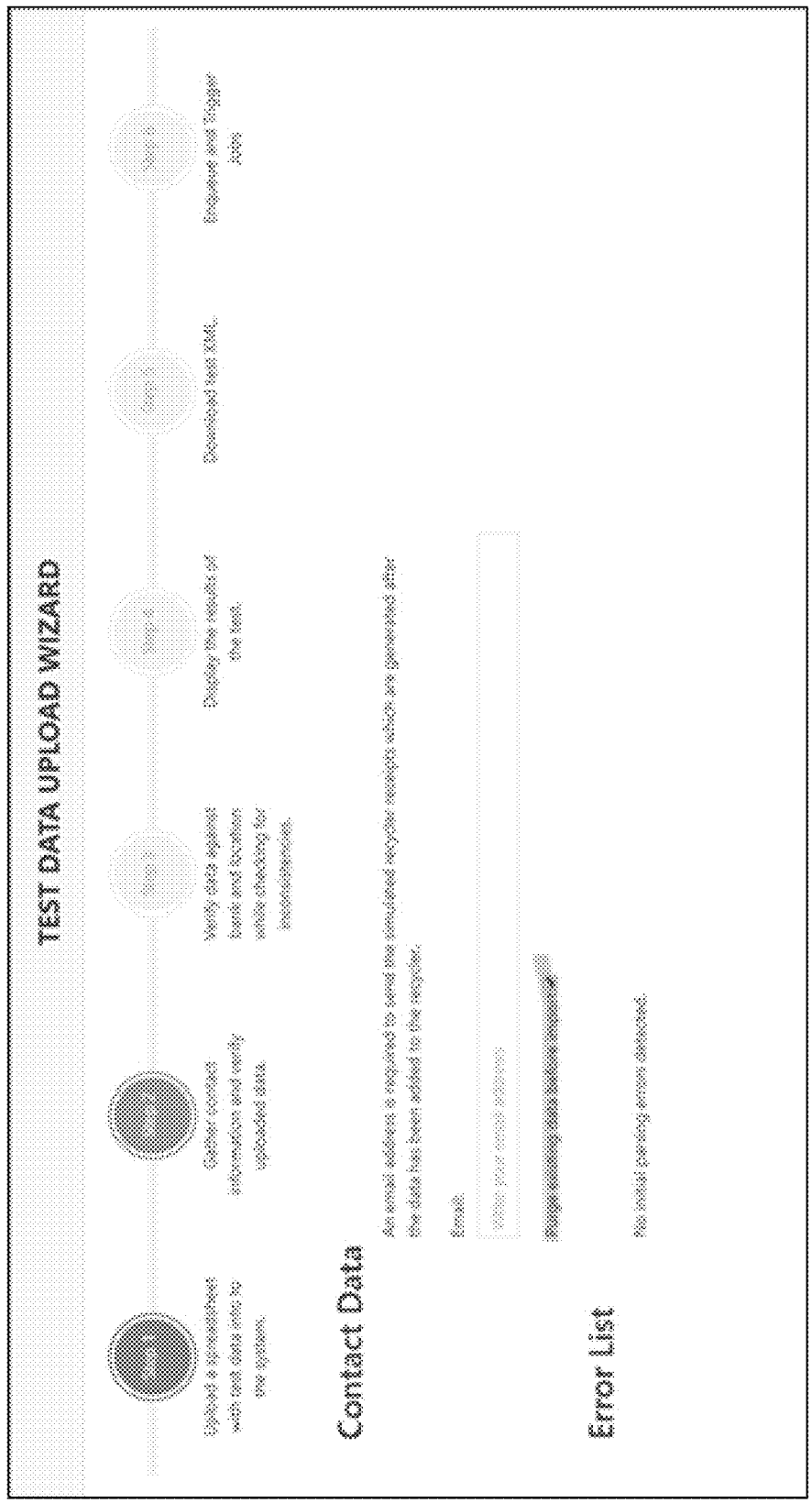
FIGS. 8-10 are additional example graphical user interfaces generated by an example system in accordance with certain embodiments.

As further indicated at Block 506, the monitoring server 120 is further configured for providing an error output interface embodied as a graphical user interface displaying any errors within the input data. FIG. 8 illustrates an example graphical user interface configured for inclusion of a listing of any errors generated as a result of the input data being not in compliance with relevant general rules or cash handling device specific rules. Upon determining that one or more errors are generated for an input data set, the monitoring server 120 is configured to provide an interactive graphical user interface indicating that one or more corrections are necessary for the input data set prior to running a complete simulation. In certain embodiments, the monitoring server 120 is configured to determine a location of data causing the error (e.g., a row number within an input data file, an entry number within a series of input data entries provided via a graphical user interface, and/or the like. Accordingly, a user is provided with sufficient information to quickly locate the source of a generated error to update the provided input data. The displayed graphical user interface may be configured to provide an interactive user interface element (e.g., a hyperlink) directing the graphical user interface to display a simulation input data (or test data upload) graphical user interface enabling a user to provide a corrected input data set.

Upon determining that the simulation input data does not result in generation of errors, the monitoring server 120 is configured to initialize one or more simulated cash handling devices to execute a simulation (as reflected at Block 508) in accordance with the simulation operation data corresponding with the simulated cash handling devices identified as discussed herein. The simulated cash handling devices are executed for each of the one or more cash handling devices identified within the simulation data (e.g., identifying cash handling device profiles for use in a simulation based at least in part on machine identifying data included within the simulation data), and accordingly the simulation is configured to generate output of the simulated cash handling devices that is representative of output that would be generated by physical cash handling devices represented by those simulated cash handling devices. Moreover, execution of the simulated cash handling devices thereby simulates physical movement of cash relative to the cash handling device (e.g., between storage locations (cassettes) within the cash handling device, into/out of the cash handling device, and/or the like). Accordingly, by tracking simulated cash movement relative to a simulated cash handling device, the monitoring server 120 is configured to maintain a cash ledger for the simulated cash handling device that is analogous to the cash ledger maintained by a physical cash handling device so as to ensure that proper amounts of cash are reflected within data stored in association with the simulated cash handling device and reflecting the amount of cash stored within the simulated cash handling device. Moreover, to provide an accurate simulation of operation of various cash handling devices, the simulation may be configured for generating and/or otherwise providing an error message reflective of error messages that may be generated by a cash handling device based on input data that would cause a physical cash handling device to generate an error message to be displayed via an integrated display device to a user. Such error messages generated as a part of the simulation may be indicative of incorrectly executing features of the cash handling device (which may require software updates to be provided to the cash handling device hardware). Such error messages may additionally be indicative of proper operation of a cash handling device, such as in instances in which a user does not have proper authorization to access requested data. Accordingly, the generation of error messages as a part of an executed simulation provides an accurate indication of the operation of cash handling devices, thereby enabling users to assess how particular simulation input data would be processed at a cash handling device.

In certain embodiments, the simulation may be executable with respect to a single transaction, in which instance the monitoring server 120 is configured to generate one or more graphical user interfaces indicative of output generated by the simulated cash handling device. The one or more graphical user interfaces may comprise one or more graphical user interfaces representative of graphical user interfaces that may be generated and/or displayed at a cash handling device during the simulated transaction. In other embodiments, the one or more graphical user interfaces may comprise data indicative of any overall outputs that may be generated by the simulated cash handling device as a result of the transaction. When executing a simulation for a single transaction, the monitoring server 120 may be configured to update the cash ledger stored for the simulated cash handling device so as to maintain an accurate indication of an amount of cash stored within the simulated cash handling device.

Figure 9:
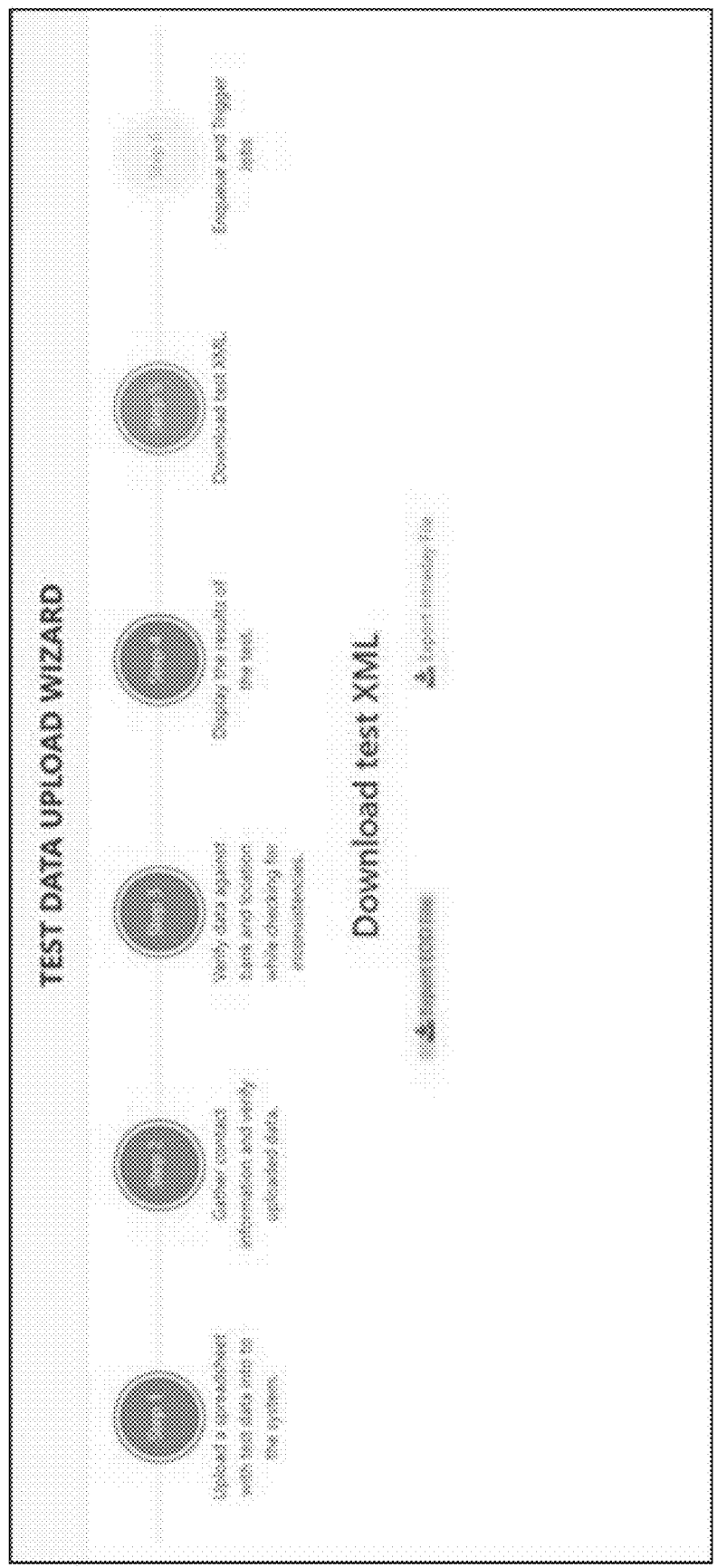

In certain embodiments, the simulation is configured to execute for a plurality of transactions simultaneously (e.g., in parallel or in series as provided by execution configurations of the processors of the monitoring server 120, without requiring additional user interaction). Such configurations are provided to generate output reports as indicated at Block 509 comprising data indicative of the execution of each of the one or more cash handling devices within one or more reports that may be output and/or otherwise exported for providing to an external computing entity, such as a financial institution computing entity. Such output reports may be indicative of the contents of the cash ledgers maintained for the one or more simulated cash handling devices, so as to provide an indication of changes in an amount of cash stored within each of the one or more cash handling devices included within a particular simulation. The resulting output reports may be provided in any of a variety of file formats, such as a delimited file format (e.g., .csv, .xlsx, and/or the like) that provides data indicative of each transaction occurring at each of the one or more simulated cash handling devices. Such output reports may comprise a plurality of transactional entries, with each transaction entry comprising data identifying the cash handling device at which the simulated transaction occurred, the amount of funds involved in the simulated transaction, the date and/or time stamp at which the simulated transaction was executed, a user identifier associated with the simulated transaction, a starting balance within the simulated cash handling device, an ending balance within the cash handling device, and/or the like. In certain embodiments, the data indicative of the amount of funds involved in the transaction, and the data indicative of the starting and ending balances within the simulated cash hanhding device may be provided at a denominational level within the cash ledger and/or generated reports, so as to provide data indicative of the amount of each denomination of cash that is involved in the simulated transaction, and for providing data indicative of the starting and ending balances of each denomination of cash within the simulated cash handling device. The resulting report may be provided for download by a user via a graphical user interface similar to that illustrated in FIG. 9.

Figure 10:
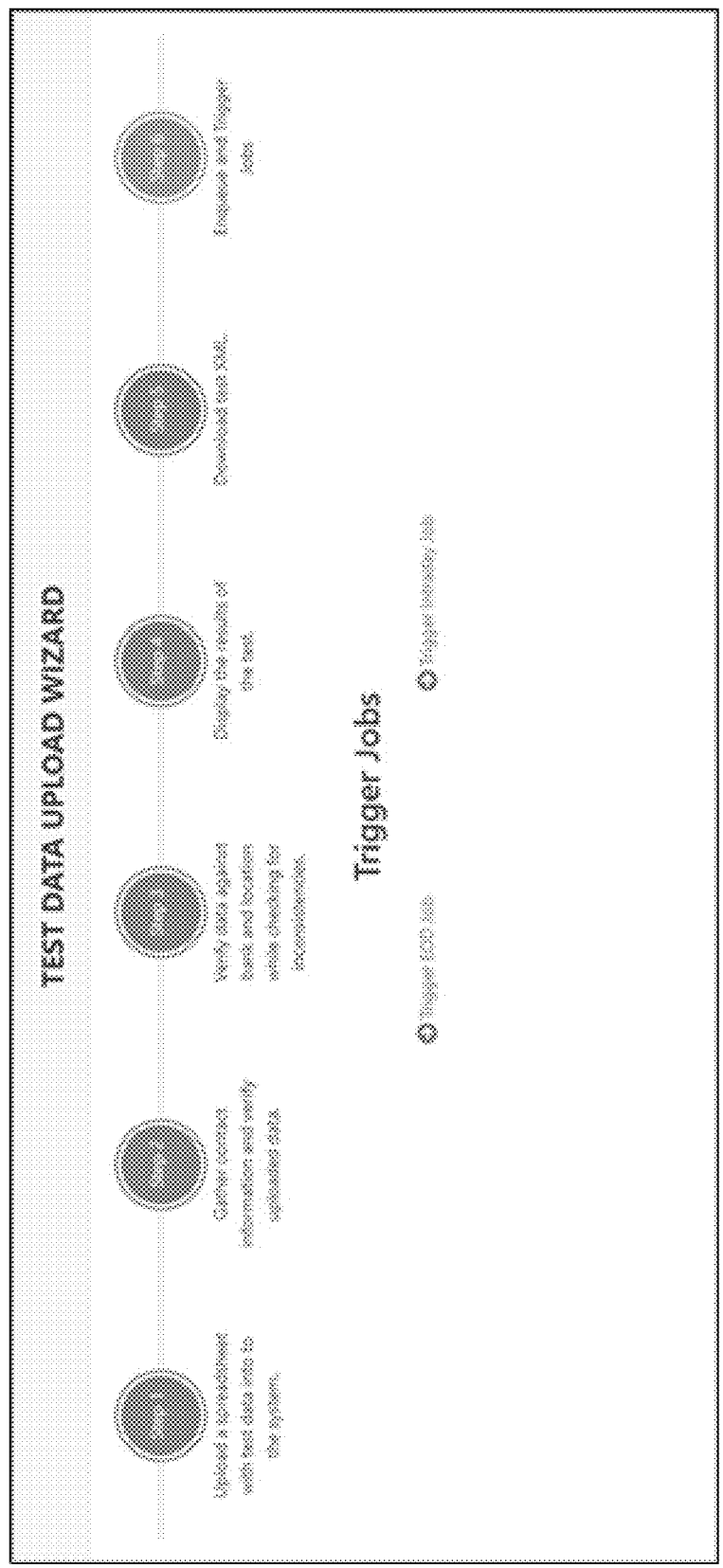

Moreover, in certain embodiments, the simulation may be embodied as a multi-stage simulation. As reflected in FIG. 10, the monitoring server 120 may be configured to separately execute one or more end-of-day simulations configured to generate simulated data representative of data generated by a cash hanhding device when executing end-of-day processes associated with checking-in tills at an end-of-day, for automatically reconciling transactions occurring through the business day relative to the amount of cash within the simulated cash handling device, and/or the like. Such end-of-day simulation processes may generate additional reports (e.g., delimited reports) providing additional data regarding the results of the end-of-day processes, including data indicative of reconciliation errors, data indicative of tracking data for cash transported to one or more financial institution, and/or the like. Similarly, as reflected in FIG. 10, the simulation may be configured for executing an intraday report configuration. Such intraday report configurations may be configured for reflecting the results of intraday reconciliation processes, movement of cash within a simulated cash handling device between separate cash storage areas (e.g., from a recycler cassette to a deposit cassette), and/or the like.

As reflected at Block 510, the monitoring server 120 is configured to transmit the one or more output reports to a computing entity based at least in part on the user identifying data provided prior to execution of the one or more simulations. For example, the one or more output reports may be transmitted via email, via other file-transfer protocols (e.g., JSON), and/or the like. The file-transfer protocol utilized may be reflective of a file-transfer protocol utilized during generation and transmission of actual-generated reports of physical cash handling devices, thereby providing additional simulation of the process of generating and transmitting reports for consumption by one or more computing entities.

The simulation may be executed for a single simulated day (and all simulated transactions with the cash handling device occurring within the same simulated day) or for a plurality of consecutive days in which the ending balance of the simulated cash handling device (and any corresponding simulated financial institution accounts) from a first simulated day is carried over to begin the next, consecutive simulated day. Moreover, for those multi-day simulations, the simulation may be configured for receipt of data simulating late deposits for a given business day (e.g., cash till deposits received at the cash handling device after any end-of-day reports are generated), such that the cash handling device may attribute such late deposits (or late withdrawals) to an appropriate business day during a next end-of-day process completed for the simulated cash handling device. Such simulations thereby enable testing of outputs generated by one or more cash handling devices as a result of later processing of late transactions.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cash handling device operation simulation system, wherein the cash handling device operation simulation system comprises:
    one or more memory storage areas storing:
        cash handling device data comprising a plurality of cash handling device profiles each comprising (1) data identifying a cash handling device type for a corresponding cash handling device and a location identifier for the corresponding cash handling device and (2) baseline data defining a current status of a cash ledger identifying a physical position of cash within the corresponding cash handling device; and
        simulation operation data for a plurality of cash handling device types; and
    one or more processors collectively configured to:
        receive simulation data comprising simulated input data for processing via one or more simulated cash handling devices and machine-identifying data identifying one or more of the cash handling device profiles for execution of a simulation, wherein the simulated input data reflects simulated transactions with one or more simulated cash handling devices to simulate physical cash movement within a corresponding cash handling device to simulate changes to the cash ledger reflected within the baseline data corresponding to the corresponding cash handling device;

initialize one or more simulated cash handling devices comprising a simulated cash handling device for each of the one or more cash handling device profiles identified within the machine-identifying data, wherein the one or more simulated cash handling devices are initiated to reflect simulated cash positions within the simulated cash handling device to match the baseline data stored within a cash handling device profile corresponding to each of the one or more simulated cash handling devices;

execute the one or more simulated cash handling devices, wherein executing the one or more simulated cash handling devices comprises simulating physical movement of cash within each of the one or more simulated cash handling devices based at least in part on the simulated input data and updating the cash ledger reflected within baseline data of corresponding cash handling devices based at least in part on the simulated physical movement of cash within each of the one or more simulated cash handling devices;

generate one or more output data files based at least in part on the executed one or more simulated cash handling devices, wherein the one or more output data files are generated based at least in part on the simulation operation data corresponding with the simulated cash handling devices; and transmit the one or more output data files to an external computing system in accordance with the simulated cash handling device data.

2. The cash handing device operation simulation system of claim 1, wherein the one or more processors are further configured to, upon receipt of data indicating a software update is provided to one or more physical cash handling devices, update one or more cash handling device profiles such that simulated cash handling devices reflect the software update.

3. The cash handling device operation simulation system of claim 1, wherein:
receiving simulation data comprises receiving simulation data files for each of a plurality of simulated cash handling devices;
executing the one or more simulated cash handling devices comprises executing a plurality of simulated cash handling devices based at least in part on respective simulation data files of the simulation data; and
generating one or more output data files comprises generating at least one output data file by each of the plurality of simulated cash handling devices.

4. The cash handling device operation simulation system of claim 1, wherein generating one or more output data files comprises generating at least one error message in accordance with the simulation operation data.

5. The cash handling device operation simulation system of claim 1, wherein the one or more processors are collectively configured to generate a series of graphical user interfaces to facilitate execution of the simulated cash handling devices, wherein the series of graphical user interfaces comprises:

an input interface configured to accept the simulation data;
an error output interface configured to provide user input indicative of one or more errors generated during execution of the one or more simulated cash handling devices; and
an output interface comprising one or more downloadable output data files.

6. The cash handling device operation simulation system of claim 1, wherein generating the one or more output data files comprises generating a metadata tag for the one or more output data files identifying each of the one or more output data files as simulated output data files.

7. The cash handling device operation simulation system of claim 6, wherein the one or more output data files comprise simulated time stamps associated with each of a plurality of output data records.

8. A computer-implemented method comprising:
storing within one or more memory storage areas, cash handling device data comprising a plurality of cash handling device profiles each comprising (1) data identifying a cash handling device type for a corresponding cash handling device and a location identifier for the corresponding cash handling device and (2) baseline data defining a current status of a cash ledger identifying a physical position of cash within the corresponding cash handling device;
storing, within the one or more memory storage areas, simulation operation data for a plurality of cash handling device types;
receiving, via one or more processors, simulation data comprising simulated input data for processing via one or more simulated cash handling devices and machine-identifying data identifying one or more of the cash handling device profiles for execution of a simulation, wherein the simulated input data reflects simulated transactions with one or more simulated cash handling devices to simulate physical cash movement within a corresponding cash handling device to simulate changes to the cash ledger reflected within the baseline data corresponding to the corresponding cash handling device;
initializing, via the one or more processors, one or more simulated cash handling devices comprising a simulated cash handling device for each of the one or more cash handling device profiles identified within the machine-identifying data, wherein the one or more simulated cash handling devices are initiated to reflect simulated cash positions within the simulated cash handling device to match the baseline data stored within a cash handling device profile corresponding to each of the one or more simulated cash handling devices;
executing, via the one or more processors, the one or more simulated cash handling devices, wherein executing the one or more simulated cash handling devices comprises simulating physical movement of cash within each of the one or more simulated cash handling devices based at least in part on the simulated input data and updating the cash ledger reflected within baseline data of corresponding cash handling devices based at least in part on the simulated physical movement of cash within each of the one or more simulated cash handling devices;
generating, via the one or more processors, one or more output data files based at least in part on the executed one or more simulated cash handling devices, wherein the one or more output data files are generated based at least in part on the simulation operation data corresponding with the simulated cash handling devices; and
transmitting, via the one or more processors, the one or more output data files to an external computing system in accordance with the simulated cash handling device data.

9. The computer-implemented method of claim 8, further comprising, upon receipt of data indicating a software update is provided to one or more physical cash handling devices, updating one or more cash handling device profiles such that simulated cash handling devices reflect the software update.

10. The computer-implemented method of claim 8, wherein:
receiving simulation data comprises receiving simulation data files for each of a plurality of simulated cash handling devices;
executing the one or more simulated cash handling devices comprises executing a plurality of simulated cash handling devices based at least in part on respective simulation data files of the simulation data; and
generating one or more output data files comprises generating at least one output data file by each of the plurality of simulated cash handling devices.

11. The computer-implemented method of claim 8, wherein generating one or more output data files comprises generating at least one error message in accordance with the simulation operation data.

12. The computer-implemented method of claim 8, further comprising generating a series of graphical user interfaces to facilitate execution of the simulated cash handling devices, wherein the series of graphical user interfaces comprises:
an input interface configured to accept the simulation data;
an error output interface configured to provide user input indicative of one or more errors generated during execution of the one or more simulated cash handling devices; and
an output interface comprising one or more downloadable output data files.

13. The computer-implemented method of claim 8, wherein generating the one or more output data files comprises generating a metadata tag for the one or more output data files identifying each of the one or more output data files as simulated output data files.

14. A computer program product comprising a non-transitory computer readable medium having computer program instructions stored therein, the computer program instructions when executed by a processor, cause the processor to:
store within one or more memory storage areas, cash handling device data comprising a plurality of cash handling device profiles each comprising (1) data identifying a cash handling device type for a corresponding cash handling device and a location identifier for the corresponding cash handling device and (2) baseline data defining a current status of a cash ledger identifying a physical position of cash within the corresponding cash handling device;
store, within the one or more memory storage areas, simulation operation data for a plurality of cash handling device types;
receive simulation data comprising simulated input data for processing via one or more simulated cash handling devices and machine-identifying data identifying one or more of the cash handling device profiles for execution of a simulation, wherein the simulated input data reflects simulated transactions with one or more simulated cash handling devices to simulate physical cash movement within a corresponding cash handling device to simulate changes to the cash ledger reflected within the baseline data corresponding to the corresponding cash handling device;
initialize one or more simulated cash handling devices comprising a simulated cash handling device for each of the one or more cash handling device profiles identified within the machine-identifying data, wherein the one or more simulated cash handling devices are initiated to reflect simulated cash positions within the simulated cash handling device to match the baseline data stored within a cash handling device profile corresponding to each of the one or more simulated cash handling devices;
execute the one or more simulated cash handling devices, wherein executing the one or more simulated cash handling devices comprises simulating physical movement of cash within each of the one or more simulated cash handling devices based at least in part on the simulated input data and updating the cash ledger reflected within baseline data of corresponding cash handling devices based at least in part on the simulated physical movement of cash within each of the one or more simulated cash handling devices;
generate one or more output data files based at least in part on the executed one or more simulated cash handling devices, wherein the one or more output data files are generated based at least in part on the simulation operation data corresponding with the simulated cash handling devices and
transmit the one or more output data files to an external computing system in accordance with the simulated cash handling device data.

15. The computer program product of claim 14, wherein generating one or more output data files comprises generating at least one error message in accordance with the simulation operation data.

16. The computer program product of claim 14, wherein the computer program instructions are further configured to, when executed by a processor, cause the processor to generate a series of graphical user interfaces to facilitate execution of the simulated cash handling devices, wherein the series of graphical user interfaces comprises:
an input interface configured to accept the simulation data;
an error output interface configured to provide user input indicative of one or more errors generated during execution of the one or more simulated cash handling devices; and
an output interface comprising one or more downloadable output data files.

17. The computer program product of claim 14, wherein generating the one or more output data files comprises generating a metadata tag for the one or more output data files identifying each of the one or more output data files as simulated output data files.

* * * * *